United States Patent [19]
Raith

[11] Patent Number: 5,930,706
[45] Date of Patent: Jul. 27, 1999

[54] DETECTING MESSAGES TRANSMITTED OVER A COMMUNICATIONS CHANNEL SUCH AS A PAGING CHANNEL

[75] Inventor: Alex Krister Raith, Durham, N.C.

[73] Assignee: Ericsson Inc., Research Triangle Park, N.C.

[21] Appl. No.: 08/564,420

[22] Filed: Nov. 29, 1995

[51] Int. Cl.$^6$ ............................................. A63B 69/00
[52] U.S. Cl. .............................. 455/422; 455/38.1
[58] Field of Search .................. 455/458, 38.1, 455/70, 343, 418, 422, 31.1, 403

[56] References Cited

U.S. PATENT DOCUMENTS

| | | | |
|---|---|---|---|
| 4,736,375 | 4/1988 | Tannhauser et al. | 371/27 |
| 5,309,474 | 5/1994 | Gilhousen et al. | 375/1 |
| 5,404,355 | 4/1995 | Raith | 370/95.1 |
| 5,663,965 | 9/1997 | Seymour | 371/22.31 |

FOREIGN PATENT DOCUMENTS

| | | |
|---|---|---|
| 0 655 872 A2 | 5/1995 | European Pat. Off. . |
| 0 663 635 A1 | 7/1995 | European Pat. Off. . |
| 2114343 | 8/1983 | United Kingdom . |
| WO 93/16565 | 8/1993 | WIPO . |
| WO 95/01018 | 1/1995 | WIPO . |
| WO 95/12934 | 5/1995 | WIPO . |

OTHER PUBLICATIONS

Mouly, Michel and Pautet, Marie–Bernadette, "The GSM System for Mobile Communications", Europe Media, pp. 192–193, 227–230, and 245–246 (Jan. 1, 1993).

*Primary Examiner*—William Cumming
*Attorney, Agent, or Firm*—Robert A. Samra

[57] ABSTRACT

The present invention allows for the detection of data contained in transmitted messages (e.g., page messages) at a selected early point in the receiving and decoding process. By forming, at that point, a received data vector (RDV) from the data corresponding to a received message, and by comparing the RDV with one or more test data vectors (TDVs) representing selected relevant or irrelevant data contained in transmitted messages, the receiver (e.g., mobile station) can determine whether the received message contains relevant data which should be fully decoded or irrelevant data which does not need to be fully decoded. In this manner, substantial processing and power savings can be achieved in the receiver.

112 Claims, 7 Drawing Sheets

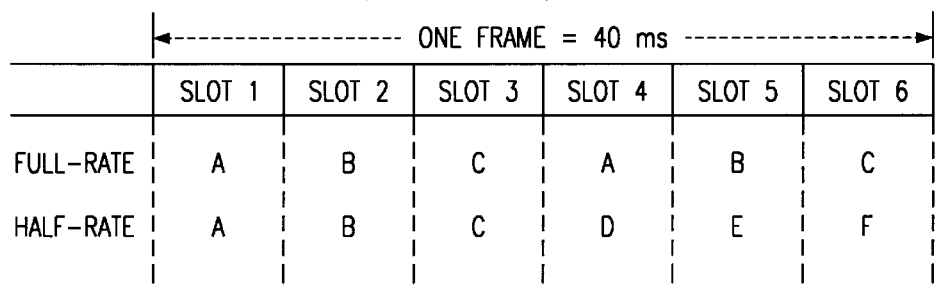
FIG. 2
(PRIOR ART)
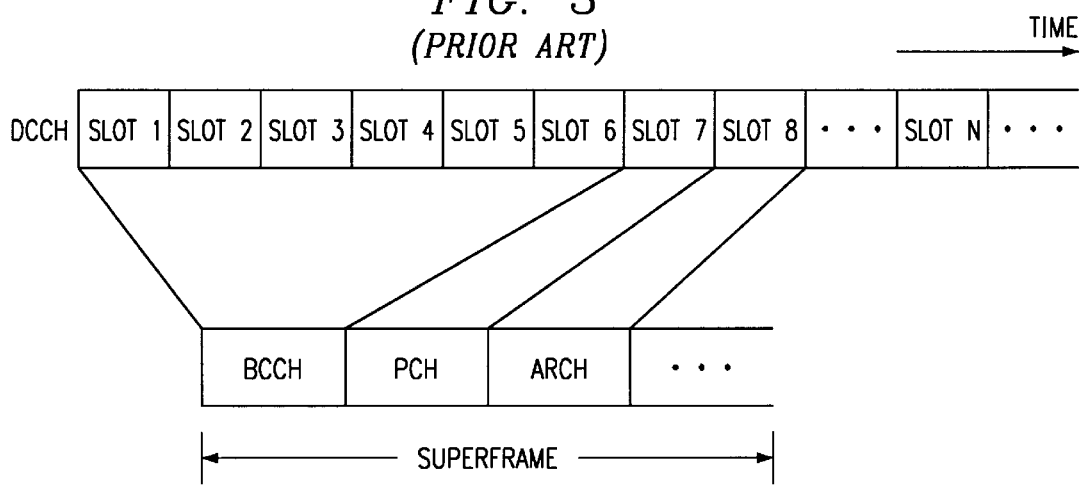
FIG. 3
(PRIOR ART)
FIG. 5
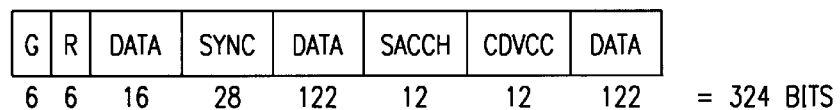
FIG. 7
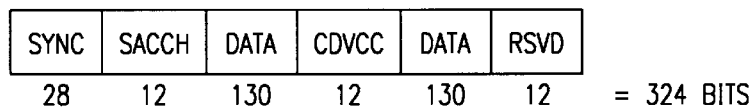

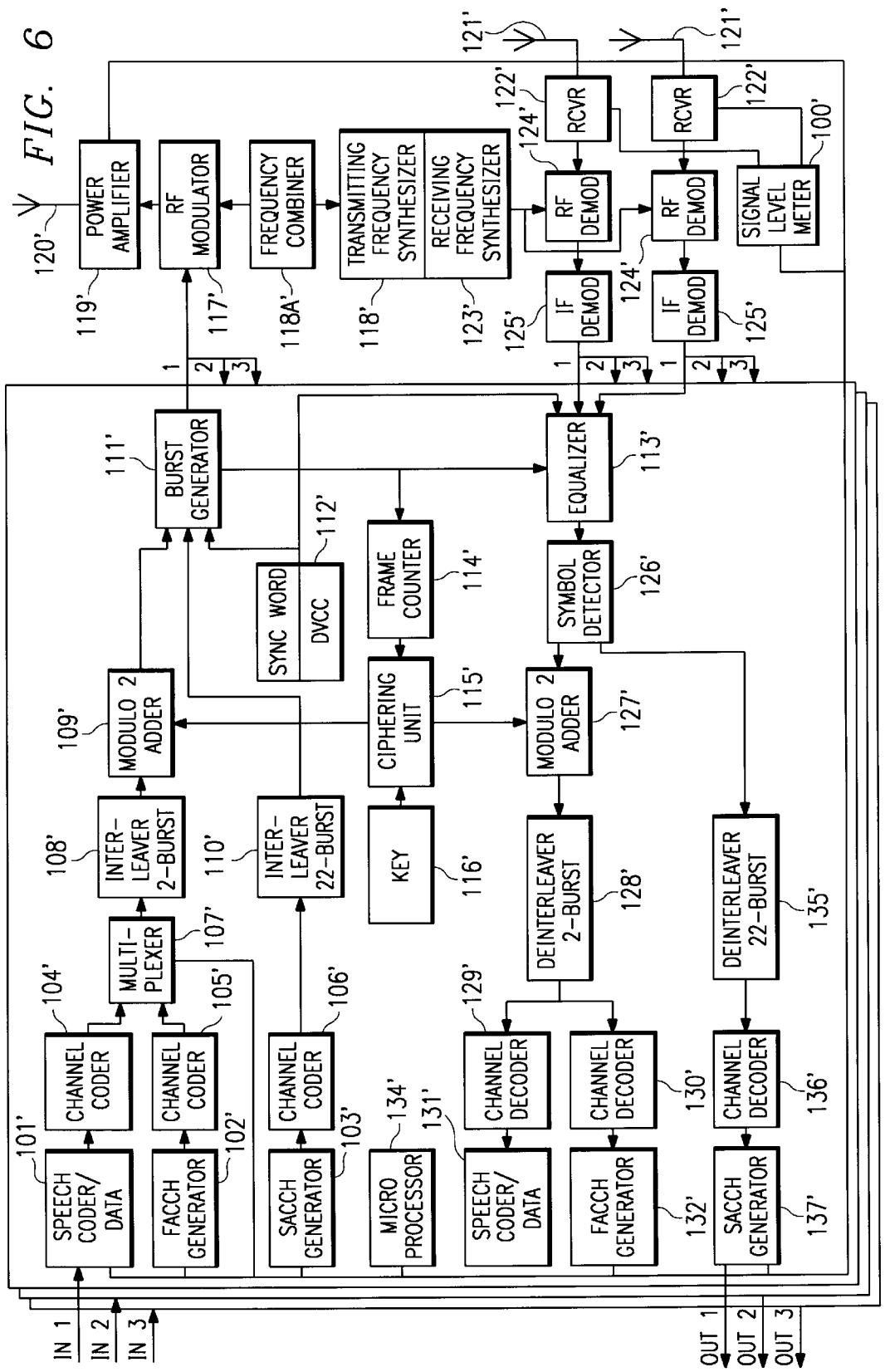

DETECTING MESSAGES TRANSMITTED OVER A COMMUNICATIONS CHANNEL SUCH AS A PAGING CHANNEL

BACKGROUND OF THE INVENTION

1. Field of the Invention

The present invention relates to wireless communication systems and, more particularly, to a method and apparatus for detecting messages transmitted over a communications channel such as a paging channel (PCH) defining part of a digital control channel (DCCH) in a cellular radio system.

2. Related Prior Art Systems

The prior art systems include cellular radio systems which have been operating in the United States since the early 1980s. In a typical cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequency (RF) channels assigned to the system. The RF channels allocated to any given cell may be reallocated to a distant cell in accordance with a frequency reuse pattern as is well known in the art. In each cell, at least one RF channel (called the "control" or "paging/access" channel) is used to carry control or supervisory messages, and the other RF channels (called the "voice" or "speech" channels) are used to carry voice conversations. The cellular telephone users (mobile subscribers) in the cells C1–C10 are provided with portable (hand-held), transportable (hand-carried) or mobile (car-mounted) telephone units (mobile stations ) such as mobile stations M1–M9, each of which communicates with a nearby base station. The base stations B1–B10 are connected to and controlled by a mobile services switching center (MSC) 20. The MSC 20, in turn, is connected to a central office (not shown in FIG. 1) in the landline (wireline) public switched telephone network (PSTN) or to a similar facility such as an integrated system digital network (ISDN). The MSC 20 switches calls between and among wireline and mobile subscribers, controls signalling to the mobile stations, compiles billing statistics, and provides for the operation, maintenance and testing of the system.

In the United States, two different entities are licensed to operate cellular systems in each major metropolitan statistical area (MSA). To receive service, a mobile subscriber enters into a subscription agreement with one of these local operators (the local system from which service is subscribed is called the "home" system). When travelling outside the home system (called "roaming"), a mobile subscriber may be able to obtain service in a distant (called "visited") system if there is a roaming agreement between the operators of the home and visited systems. Access to a cellular system by any of the mobile stations M1–M9 is controlled on the basis of a mobile identification number (MIN) which is assigned to each mobile subscriber by the home system operator, and the electronic serial number (ESN) which is permanently stored in the mobile station (the so-called "MIN/ESN pair"). The MIN/ESN pair is sent from the mobile station when originating a call and its validity is checked by the MSC 20. If the MIN/ESN pair is determined to be invalid, the system may deny access to the mobile station. The MIN is also sent from the system to the mobile station when alerting the mobile station of an incoming call.

When turned on (powered up), each of the mobile stations M1–M9 enters the idle state (standby mode) and tunes to and continuously monitors the strongest control channel (generally, the control channel of the cell in which the mobile station is located at that moment). When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel. When a control channel with good reception quality is found, the mobile station remains tuned to this channel until the quality deteriorates again. In this manner, the mobile station remains "in touch" with the system and may receive or initiate a telephone call through one of the base stations B1–B10 which is connected to the MSC 20.

To detect incoming calls, the mobile station continuously monitors the control channel to determine whether a page message addressed to it (i.e., containing its MIN) has been received. A page message will be sent to the mobile station, for example, when an ordinary (landline) subscriber calls the mobile subscriber. The call is directed from the PSTN to the MSC 20 where the dialed number is analyzed. If the dialed number is validated, the MSC 20 requests some or all of the base stations B1–B10 to page the called mobile station throughout their corresponding cells C1–C10. Each of the base stations B1–B10 which receive the request from the MSC 20 will then transmit over the control channel of the corresponding cell a page message containing the MIN of the called mobile station. Each of the idle mobile stations M1–M9 which is present in that cell will compare the MIN in the page message received over the control channel with the MIN stored in the mobile station. The called mobile station with the matching MIN will automatically transmit a page response over the control channel to the base station which then forwards the page response to the MSC 20. Upon receiving the page response, the MSC 20 selects an available voice channel in the cell from which the page response was received (the MSC 20 maintains an idle channel list for this purpose), and requests the base station in that cell to order the mobile station via the control channel to tune to the selected voice channel. A through-connection is established once the mobile station has tuned to the selected voice channel.

When, on the other hand, a mobile subscriber initiates a call (e.g., by dialing the telephone number of an ordinary subscriber and pressing the "send" button on the telephone handset in the mobile station), the dialed number and MIN/ESN pair for the mobile station are sent over the control channel to the base station and forwarded to the MSC 20 which validates the mobile station, assigns a voice channel and establishes a through-connection for the conversation as described before.

If the mobile station moves between cells while in the conversation state, the MSC 20 will perform a "handoff" of the call from the old base station to the new base station. The MSC 20 selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MSC 20 via the new cell. The old voice channel in the old cell is marked idle in the MSC 20 and may be used for another conversation.

The original cellular radio systems, as described above, used analog transmission methods, specifically frequency modulation (FM), and duplex RF channels in accordance with the Advanced Mobile Phone Service (AMPS) standard. According to the AMPS standard, each control or voice channel between the base station and the mobile station consists of a pair of separate frequencies, a forward (downlink) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA). This AMPS (analog) architecture was the basis for the industry standard sponsored by the Electronics Industries Association (EIA) and the Telecommunication Industry Association (TIA), and known as EIA/TIA-553.

More recently, however, the cellular industry began migrating from analog to digital technology, motivated in large part by the need to address the growth in the subscriber population and the increasing demands on system capacity. To this end, the EIA/TIA has developed two distinct series of digital standards, both of which rely on voice encoding (digitization and compression) to multiply the number of voice circuits (conversations) per RF channel (i.e., to increase capacity), but each using a different access method. One of the EIA/TIA standard series uses code division multiple access (CDMA). The current standard in this series is known as the IS-95 standard. The other EIA/TIA standard series uses time division multiple access (TDMA). The original standard in this other series was known as the IS-54 standard. To ease the transition from analog to digital and to allow the continued use of existing analog mobile stations, the IS-54 standard supported the original AMPS analog voice and control channels and additionally provided for the use of digital traffic channels for speech (but not digital control channels) within the existing AMPS network. As a result, the IS-54B (the current revision of the IS-54) standard has also become known as the digital AMPS (D-AMPS) standard. However, the industry has now developed a new specification for D-AMPS which includes a digital control channel. This new specification is known as IS-136 and it builds on the IS-54B standard. All of the foregoing standards are hereby incorporated herein by reference (copies of these standards may be obtained from the Electronics Industries Association; 2001 Pennsylvania Avenue, N.W.; Washington, D.C. 20006).

According to IS-54B and as shown in FIG. 2, each RF channel is time division multiplexed (TDM) into a series of repeating time slots which are grouped into frames carrying from three to six digital speech channels (three to six telephone conversations) depending on the source rate of the speech coder used for each digital speech channel. Each frame on the RF channel comprises six equally sized time slots (1–6) and is 40 ms long (i.e, there are 25 frames per second). The speech coder for each digital traffic channel (DTCH) can operate at either full-rate or half-rate. A full-rate DTCH uses two equally spaced slots of the frame (i.e., slots 1 and 4, or slots 2 and 5, or slots 3 and 6). When operating at full-rate, the RF channel may be assigned to three users (A–C). Thus, for example, user A is assigned to slots 1 and 4, user B is assigned to slots 2 and 5, and user C is assigned to slots 3 and 6 of the frame as shown in FIG. 2. Each half-rate DTCH uses only one time slot of the frame. At half-rate, the RF channel may be assigned to six users (A–F) with each user being assigned to one of the six slots of the frame as also shown in FIG. 2. Note that although IS-54B, for convenience, defines a "frame" to be 40 ms long for both half-rate and full-rate channels, in reality the "TDM frame" is 40 ms long for half-rate channels, but it is only 20 ms long for full-rate channels (where a "TDM frame" is defined as the minimum amount of time between two repeating time slots in the same channel assigned to the same user).

Hence, unlike an analog FDMA cellular system in which the base station and the mobile station transmit and receive continuously over an RF channel, a TDMA cellular system operates in a buffer and burst dis-continuous transmission mode. Each mobile station transmits and receives in an assigned slot on the RF channel. The transmit (reverse) and receive (forward) frames, however, are offset from each other by at least one time slot period so that the mobile station will transmit and receive at different times and, therefore, can avoid using duplexer circuitry (which would be needed if the transmitter and receiver at the mobile station operated simultaneously). Thus, slot 1 of frame N in the forward direction occurs at least one time slot period after slot 1 of frame N in the reverse direction. At full-rate, for example, a mobile station assigned to slot 1 (user A in FIG. 2) would transmit for one slot period, receive in the next slot period, hold for another slot period, and then repeat this cycle. The mobile station, therefore, transmits or receives in a fraction of the time (one third for full rate and one sixth for half-rate) and can be switched off to save power the rest of the time.

Similar power savings can be achieved in the mobile station if digital transmission techniques are also applied to the control channel. The original analog control channel specified in EIA/TIA-553 and imported into IS-54B (because of the need to serve existing analog-only mobile stations) carried an overhead message train (OMT) which required continuous monitoring by the mobile station. Furthermore, an idle mobile station listening to the forward control channel was required to read all the messages transmitted in the OMT (not just paging messages) even though the information contained in these messages may not have changed from one OMT to the next OMT. These two requirements tend to unnecessarily limit the mobile station battery life. To overcome these requirements, U.S. Pat. No. 5,404,355 to Raith (the present inventor) suggests the use of a digital control channel (DCCH) which may be defined alongside the digital traffic channels (DTCH) specified in IS-54B. Referring back to FIG. 2, a half-rate DCCH would occupy one slot while a full-rate DCCH would occupy two slots out of the six slots in each 40 ms frame. The DCCH slots may then be organized into a series of superframes each comprising a plurality of logical channels which carry different kinds of information with each logical channel being allocated one or more DCCH slots.

FIG. 3 shows an exemplary DCCH superframe which includes at least three logical channels, namely, a broadcast control channel (BCCH), a paging channel (PCH), and an access response channel (ARCH). The BCCH, which in this example is allocated 6 DCCH slots, carries overhead messages. The PCH, which is allocated one DCCH slot, carries paging messages. The ARCH, which is also allocated one DCCH slot, carries voice or speech channel assignment messages. The exemplary superframe of FIG. 6 may contain other logical channels, including additional paging channels (if more than one PCH is defined, different groups of mobile stations may be assigned to different PCHs). A mobile station operating on the DCCH of FIG. 3 need only be "awake" (monitoring) during certain time slots (e.g., the BCCH and its assigned PCH) in each superframe and can enter "sleep mode" at all other times. While in sleep mode, the mobile station turns off most internal circuitry and saves battery power. Furthermore, by configuring the BCCH as taught in the aforementioned U.S. Pat. No. 5,404,355, the mobile station can read (i.e., decode) the overhead messages when locking onto the DCC (e.g., at power-up) and thereafter only when the information has changed, thus resulting in additional battery power savings while allowing for fast cell selection.

For maximum sleep mode efficiency, however, it is also desirable that the mobile station avoid the requirement of reading all PCH messages since only a fraction of the page messages received over the PCH will be directed to the mobile station and the other messages will either be empty messages ("filler" messages containing no page) or pages to other mobile stations. In practice, most of the messages carried over the PCH will be empty page messages. This is due to the fact that the PCH will usually be operated substantially below the capacity limit in order to avoid excessive traffic blocking (and, hence, delay in delivering pages to the mobile stations). If blocking problems do develop (e.g., because of unanticipated demand) in any cell, the operator can assign additional control channels in that cell or use other capacity-enhancing techniques such as cell splitting. Thus, in general, an appropriately-managed PCH will be operated at a level far below maximum capacity, even at busy hour. Viewed over a 24-hour period, including hours of low traffic activity, the average traffic carried on the PCH will be significantly less than the maximum capacity. Consequently, more often than not, the PCH is carrying not page messages but empty messages. Furthermore, since a mobile station usually receives no more than a few calls each day, most of the page messages sent on the PCH will be for other mobile stations.

To maximize sleep mode efficiency, the mobile station should be able to detect whether the received page messages are relevant messages (e.g., page messages directed to this particular mobile station) or irrelevant messages (e.g., empty page messages or page messages directed to other mobile stations) as early as possible in the receive processing (e.g., after demodulation but before decoding) so as to avoid as many signal processing steps as possible. Once an irrelevant page is detected, the mobile station can immediately return to sleep. To appreciate the possible power savings from an early detection of irrelevant pages, consider a typical PCH in which a paging message is sent once per second. This means that there are (60*60*24=) 86,400 page messages sent to the mobile station each day. If, for example, the PCH carries non-empty page messages only 10% of the time, the mobile station can avoid processing 90% of the page messages if it can detect empty pages. Furthermore, if only a few of the non-empty page messages are directed to this mobile station, it can avoid processing almost all of the page messages transmitted on the PCH if it can also detect that the other non-empty page messages are directed to other mobile stations. Thus, the mobile station effectively can be in sleep mode during PCH reception.

SUMMARY OF THE INVENTION

It is therefore an object of the present invention to provide a method and apparatus for detecting a transmitted message and determining whether it contains relevant information which should be processed further by a receiver.

It is also an object of the present invention to provide a method and apparatus for detecting a transmitted message and determining whether it contains irrelevant information which need not be processed further by a receiver.

It is a further object of the present invention to provide a method and apparatus for detecting an empty page message received at a mobile station.

It is a still further object of the present invention to provide a method and apparatus for detecting a non-empty page message received at a mobile station.

It is another object of the present invention to provide a method and apparatus for detecting a page message directed to a particular mobile station.

It is still another object of the present invention to provide a method and apparatus for detecting page messages directed to other mobile stations.

It is yet another object of the present invention to maximize the sleep mode efficiency of mobile stations which receive page messages.

In one aspect, the present invention provides a method for detecting messages containing various data, the messages being transmitted over a communications channel to a receiver, the method comprising the steps of storing in the receiver at least one test data vector (TDV) representing selected data contained in at least one of the messages; receiving at the receiver data corresponding to one of the messages; processing the received data to form a received data vector (RDV); and comparing the RDV to the at least one TDV to determine whether the selected data is contained in the received data. If the selected data is determined to be contained in the received data, the received data may be further processed (e.g., if the selected data is a page) or may not be further processed (e.g., if the selected data is an empty page) by the receiver, or the receiver may take a specified action (e.g., if the selected data is a page, the action may be to respond to the page).

In another aspect, the present invention provides a mobile station operating in a communications system which transmits to the mobile station a plurality of different page messages including an empty page message containing no page and a non-empty page message containing one or more pages to one or more mobile stations operating in the system, the mobile station comprising means for storing a test data vector (TDV) representative of an empty page message; means for receiving from the system data corresponding to one of the page messages; means for processing the received page message data into a received data vector (RDV); means for comparing the RDV with the empty page TDV to determine whether the received page message data corresponds to an empty page message; and means for decoding the received page message data. In this aspect, the mobile station may discontinue processing of the received page message data if it is determined to correspond to an empty page message, and may decode the received page message data if it is determined not to correspond to an empty page message.

In still another aspect, the present invention provides a mobile station operating in a communications system which transmits to the mobile station a plurality of different page messages including an empty page message containing no page and a non-empty page message containing one or more pages to one or more mobile stations operating in the system, the mobile station comprising means for storing at least one test data vector (TDV) representative of a non-empty page message containing a specific page to this mobile station; means for receiving from the system data corresponding to one of the page messages; means for processing the received page message data into a received data vector (RDV); means for comparing the RDV with the at least one specific page TDV to determine whether the received page message data corresponds to a non-empty page message containing the specific page; and means for decoding the received page message data. In this aspect, the mobile station may decode the received page message data or simply transmit a page response without decoding the received page message data if it is determined to correspond to a non-empty page message containing the specific page, and may discontinue processing of the received page message data if it is determined not to correspond to a non-empty page message containing the specific page.

In yet another aspect, the present invention provides a method for detecting page messages transmitted to a mobile station, each of the page messages being an empty page message containing no page to any mobile station or a non-empty page message containing one or more pages to one or more mobile stations, the method comprising the steps of storing in the mobile station a first set of test data vectors (TDVs) representative of an empty page message; storing in the mobile station a second set of TDVs representative of a non-empty page message containing a specific page for the mobile station; receiving data corresponding to a transmitted page message; processing the received page message data to form a received data vector (RDV); comparing the RDV with the first or second set of TDVs; if the RDV is being compared with the first set of TDVs, determining whether the received page message data corresponds to an empty page message; and if the RDV is being compared with the second set of TDVs, determining whether the received page message data corresponds to a non-empty page message containing the specific page. If the received page message data is determined to correspond to an empty page message, the mobile station may discontinue processing of the received page message data. On the other hand, if the received page message data is determined to correspond to a non-empty page message containing the specific page, the mobile station may decode the received page message data or simply transmit a page response without decoding the received page message data.

BRIEF DESCRIPTION OF THE DRAWINGS

The present invention will be better understood and its numerous objects and advantages will become apparent to those skilled in the art by reference to the following drawings in which:

FIG. 2 shows the structure of a time division multiplexed (TDM) radio frequency (RF) channel according to IS-54B, a known industry standard;

FIG. 3 shows an exemplary structure for a superframe of a digital control channel (DCCH) defined over the TDM RF channel shown in FIG. 2;

FIG. 5 shows the IS-54B slot format for time division multiple access (TDMA) transmissions from the mobile station of FIG. 4;

FIG. 6 is a block diagram of a base station which communicates with the mobile station of FIG. 4;

FIG. 7 shows the IS-54B slot format for TDM transmissions from the base station of FIG. 6;

DETAILED DESCRIPTION

Figure 1:
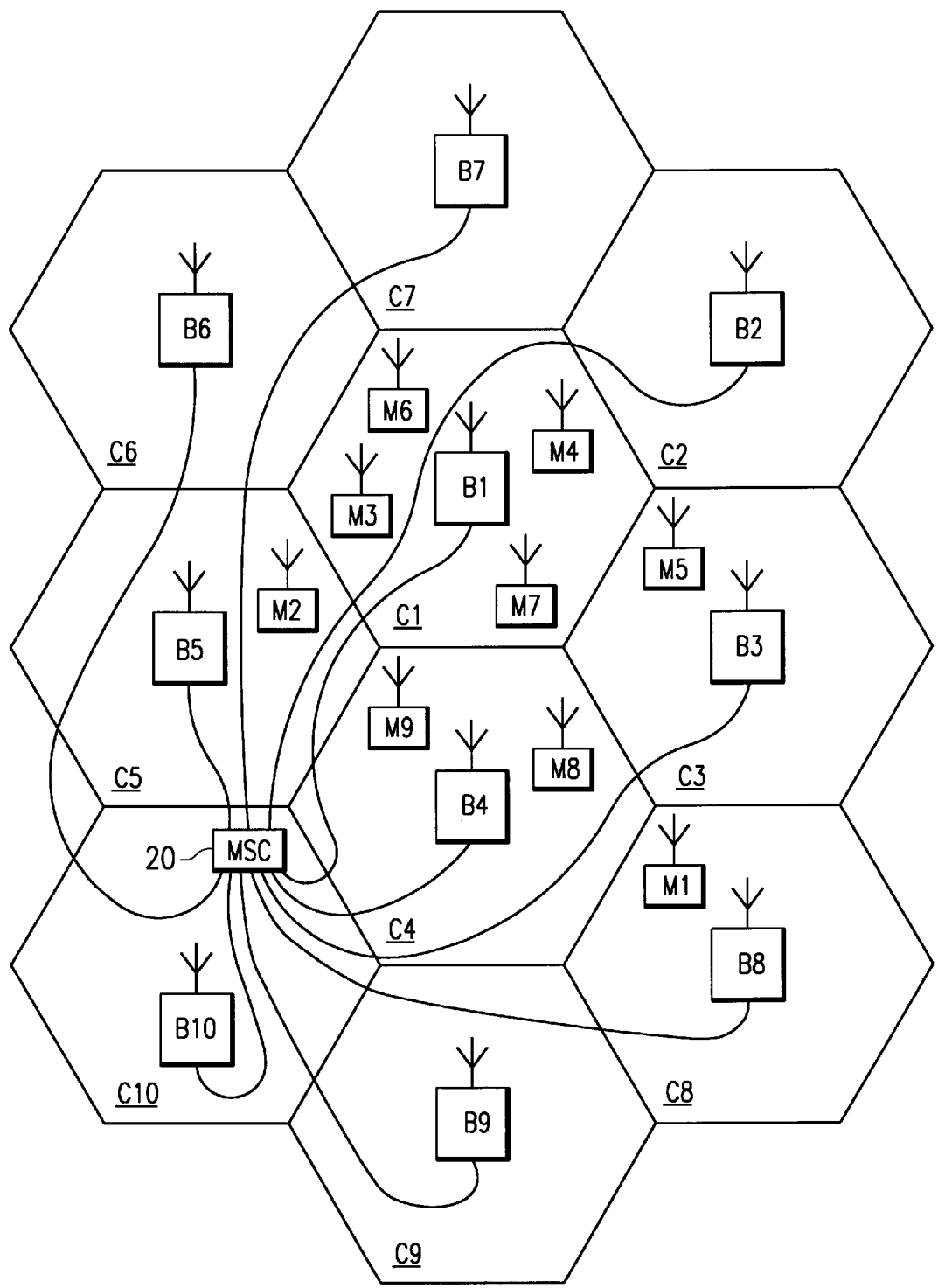
FIG. 1 shows the architecture of a conventional cellular radio system.
Figure 4:
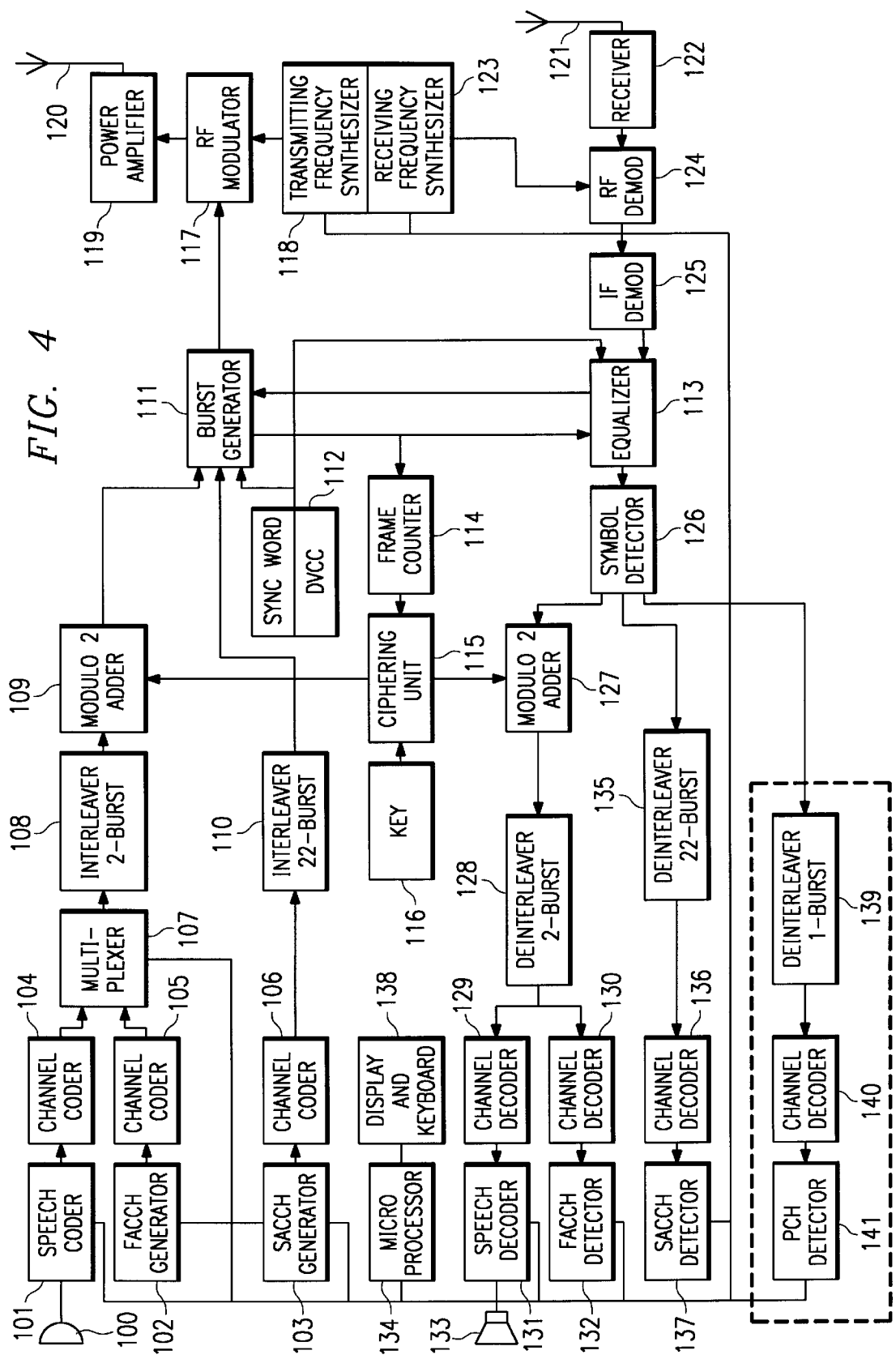
FIG. 4 is a block diagram of an exemplary mobile station which may be used in accordance with the present invention.

Referring first to FIG. 4, there is shown a block diagram of an exemplary mobile station which is generally compliant with IS-54B and which may be used in accordance with the present invention. In FIG. 4, certain components which are relevant to communications over digital channels are shown, but it will be appreciated that other digital or analog components may be used in addition to or in place of some of these components. The exemplary mobile station of FIG. 4 can transmit and receive speech and control data. The transmit circuitry is generally depicted in the upper half of FIG. 4 while the receive circuitry is generally depicted in the lower half of FIG. 4.

In the mobile station of FIG. 4, speech from the user is detected as an analog voice signal by a microphone 100 and then passed through one or more voice processing stages (not shown in FIG. 4) before being provided as input to a speech coder 101. The pre-coding voice processing stages may include audio level adjustment, bandpass filtering and analog-to-digital conversion (e.g., 13-bit PCM format or 8-bit μlaw format) followed by additional high-pass filtering. The speech coder 101 uses a voice compression algorithm (e.g., RELP or VSELP) to compress the voice signal into a low-rate data bit stream (e.g., from 64 kbps to 8 kbps). The output of the speech coder 101 is fed to a channel coder 104 which applies one or more error protection and/or correction techniques to the data stream. For example, the channel coder 104 may use a rate one-half convolutional code to protect the more vulnerable bits of the speech coder data stream. The channel coder 104 may also use a cyclic redundancy check (CRC) over some of the most perceptually significant bits of the speech coder frame.

Referring again to FIG. 4, control data is generated in the mobile station in a fast associated control channel (FACCH) generator 102 and a slow associated control channel (SACCH) generator 103, and error-coded in channel coders 105 and 106, respectively. FACCH messages are transmitted in a "blank and burst" mode whereby a burst of speech data is blanked and replaced with a high-rate FACCH burst. By contrast, SACCH messages are continuously transmitted at a slower rate along with each burst of speech data. In the exemplary embodiment shown in FIG. 4, SACCH messages are fed to a 22-burst interleaver 110 which spreads the SACCH data over 22 time slots prior to transmission.

With continuing reference to FIG. 4, the coded speech bits from the channel coder 104 and the coded FACCH messages from the channel coder 105 are provided to respective inputs of a time division multiplexer 107 which formats the speech data or FACCH messages into transmit time slots. The output of the multiplexer 107 is fed to a 2-burst interleaver 108 which interleaves the encoded speech or FACCH data over two time slots (e.g., slots 1 and 4 in FIG. 2) so as to ameliorate the deteriorative effects of Rayleigh fading (thus providing further protection against channel errors, in addition to error coding). This means that each speech time slot contains data from two consecutive speech coder frames or, similarly, that each FACCH message is spread over two time slots. The output of the 2-burst interleaver 108 is provided as input to a modulo-2 adder 109 where the data is ciphered on a bit-by-bit basis by logical modulo-2 addition with a pseudo-random keystream provided by a ciphering unit 115. The inputs to the ciphering unit 115 may include the value of a frame counter 114 which is incremented once every 20 ms (i.e., once every TDM frame for a full-rate channel), and a secret key 116 which is unique to the mobile station. The frame counter 114 is used to update the ciphering code (pseudo-random keystream) once every 20 ms (i.e., once for every transmitted TDM frame). The ciphering code is generated using an encryption algorithm which manipulates the bits of the secret key 116.

The ciphered data from the modulo-2 adder 109 and the interleaved SACCH data from the 22-burst interleaver 110 are provided as inputs to a burst generator 111 which is also provided with a synchronization (sync) word and a digital verification color code (DVCC) from a sync word/DVCC generator 112. The burst generator 111 formats bursts of data each comprising a sync word, DVCC, SACCH data and speech or FACCH data as shown in FIG. 5 (the "G" and "R" fields are for guard time and ramp time, respectively). The sync word is used for time slot identification and synchronization, and equalizer training at the remote receiver (i.e., base station). The DVCC is used to distinguish current traffic channels from traffic co-channels and ensures that the proper RF channel is being decoded by the receiver. The DVCC may be error-coded with, for example, a Hamming code. As will be seen below, the DVCC and sync word are also included in each of the bursts transmitted from the base station to the mobile station.

With further reference to FIG. 4, each of the message bursts from the burst generator 111 is transmitted in one of the three time slots of the TDM frame (full-rate) shown in FIG. 2 and discussed above. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the sync word and the DVCC received from the base station. Both the burst generator 111 and the equalizer 113 are connected to the frame counter 114 for timing purposes.

The message bursts produced by the burst generator 111 are provided as input to an RF modulator 117 which is used for modulating a carrier frequency in accordance with a modulation technique known as $\pi/4$ shifted, differentially encoded quadrature phase shift keying ($\pi/4$ DQPSK). The use of this technique implies that the information to be transmitted by the mobile station is differentially encoded so that 2-bit symbols are transmitted as 4 possible changes in phase ($\pm\pi/4$ and $\pm3\pi/4$) rather than absolute phases. To minimize errors due to noise in the selected RF channel, Gray coding may be used to map adjacent phase changes to symbols which differ in only one bit (since the most probable errors result in the receiver selecting an adjacent phase, such errors will be limited to single-bit errors). The carrier frequency for the selected RF channel is supplied to the RF modulator 117 by a transmitting frequency synthesizer 118. The burst-modulated carrier signal output of the RF modulator 117 is amplified by a power amplifier 119 and then transmitted to the base station through an antenna 120.

Reception at the mobile station is essentially the reverse of transmission. The mobile station receives burst modulated signals from the base station through an antenna 121 connected to a receiver 122. A receiver carrier frequency for the selected RF channel is generated by a receiving frequency synthesizer 123 and supplied to a an RF demodulator 124 which demodulates the received carrier signal into an intermediate frequency (IF) signal. The IF signal is demodulated further by an IF demodulator 125 which recovers the original digital information prior to $\pi/4$-DQPSK modulation. The digital information is then passed to the equalizer 113 which formats the information into two-bit symbols, and then to a symbol detector 126 which converts the symbols into a single-bit data stream comprised of speech or FACCH data and SACCH data. The symbol detector 126 distributes the FACCH or speech data to a modulo-2 adder 127, and the SACCH data to a 22-burst deinterleaver 135.

The modulo-2 adder 127 is connected to the ciphering unit 115 and is used to decipher the encrypted speech or FACCH data by subtracting, on a bit-by-bit basis, the same pseudo-random keystream used by the transmitter in the base station to encrypt the data. The deciphered output of the modulo-2 adder 127 is fed to a 2-burst deinterleaver 128 which reconstructs the speech or FACCH data by assembling bits from two consecutive frames of digital data. The 2-burst deinterleaver 128 is coupled to two channel decoders 129 and 130 which decode the convolutionally-coded speech or FACCH data, respectively, and check the CRC bits to determine if any error has occurred (the CRC bits also provide a method for distinguishing speech data from FACCH data). The speech data is fed from the channel decoder 129 to a speech decoder 131 which recovers the original digital speech signal. The signal is then converted to analog and filtered prior to broadcast by a speaker 133. Any FACCH messages are detected by a FACCH detector 132 and forwarded to a microprocessor 134 for appropriate action.

With continuing reference to FIG. 4, the 22-burst deinterleaver 135 reassembles the SACCH data which is spread over 22 consecutive frames. The output of the 22-burst deinterleaver 135 is provided as input to a channel decoder 136. Any SACCH messages are detected by a SACCH detector 137 and transferred to the microprocessor 134 for appropriate action.

The microprocessor 134 controls the activities of the mobile station and communications between the mobile station and the base station. Decisions are made by the microprocessor 134 in accordance with messages received from the base station and measurements performed by the mobile station. The microprocessor 134 is provided with a memory (not shown) and is also connected to a terminal keyboard input and display output unit 138. The keyboard and display unit 138 allows the user to initiate and respond to calls, and to enter information into the mobile station memory.

It should be noted that many of the components of the mobile station shown in FIG. 4 may be used to construct a base station as shown in FIG. 6 in which like components are designated with the same reference numerals as in FIG. 4 and further designated by a (') to distinguish the base station components from the mobile station components. The base station of FIG. 6 communicates with the mobile station of FIG. 4 using a slot format as shown in FIG. 7, which is similar to the slot format used by the mobile station, as shown in FIG. 5. As will be appreciated by persons of ordinary skill in the art, there may be certain differences in the construction of the base station and the mobile station. For example, as shown in FIG. 6, the base station may have not just one but two receiving antennas 121' and associated radio hardware 122'–125' for diversity reception. Furthermore, since the base station supports three (full-rate) digital traffic channels (DTCHs) per RF channel as shown in FIG. 2, the baseband processing hardware (border box in FIG. 6) may be triplicated in the base station, and the IF demodulator 125' may have not just one but three outputs, one for each of the three digital traffic channels. In addition, since the base station usually operates on multiple RF channels, it may include multiple sets of radio channel hardware (baseband processing and radio hardware) as well as a programmable frequency combiner 118A' to carry out the selection of the RF channels to be used by the base station according to the applicable cellular frequency reuse plan. On the other hand, the base station may not include a user keyboard and display unit 138, but may include a signal level meter 100' to measure the strength of the signal received by each the two antennas 121' and to provide an output to the microprocessor 134' (for handoff purposes). Other differences between the mobile station and the base station will be readily apparent to those skilled in the art.

The mobile station of FIG. 4 and the related base station of FIG. 6 are capable of operating on a digital traffic channel (DTCH), but may also be readily configured to operate on a digital control channel (DCCH) if, for example, the length and format of a DCCH slot are made compatible with those specified for the DTCH slot in IS-54, as suggested in U.S. Pat. No. 5,404,355 to Raith (the present inventor), which is incorporated herein by reference. FIG. 4 shows (in dashed box) additional mobile station components which, for example, can be used for decoding messages transmitted over a paging channel (PCH) of the DCCH. Although PCH messages, like FACCH and SACCH messages, are interleaved to protect against errors induced by the radio channel, the interleaving of PCH messages is limited to within one slot (intra-slot interleaving) since, for purposes of sleep mode efficiency, the mobile station should not be awake for more than one PCH slot. As shown in FIG. 4, after demodulation and equalization, the paging messages are deinterleaved in a 1-burst deinterleaver 139 before channel decoding in a channel decoder 140 and detection in a PCH detector 141. Any page messages are forwarded from the PCH detector 141 to the microprocessor 134 for analysis and action.

For purposes of the present invention, as described further below, although a DCCH format which is compatible with the DTCH format in IS-54B may be used, in general any DCCH format or, for that matter, interleaving method may be used such as, for example, the DCCH format and interleaving method specified in the GSM standard. Furthermore, the DCCH may be implemented using transmission techniques other than or in combination with time division multiplexing (TDM) such as, for example, code division multiplexing (CDM). Thus, it should be understood that the teachings of the present invention are generally applicable to wireless systems in which very efficient sleep mode operation is desired.

During sleep mode, the mobile station of FIG. 4 (configured to operate on a PCH of a DCCH) consumes a limited amount of power for maintaining certain memory and input/output elements (e.g., its user display and internal counters), and a greater amount of power for decoding messages transmitted over the PCH. During PCH decoding, power is consumed by the radio receiver section (e.g., the receiver 122, receiving frequency synthesizer 123, RF demodulator 124 and IF demodulator 125) while collecting the PCH slot, and by the baseband signal processing section (e.g., the sync word/DVCC generator 112, equalizer 113, symbol detector 126, 1-burst deinterleaver 139, channel decoder 140, PCH detector 141 and microprocessor 134) while decoding (reading) the page message. The present invention aims to substantially reduce or entirely eliminate the power consumed during baseband processing of PCH messages. According to the present invention, most or all of the equalization, and all of the channel decoding can be avoided for almost all PCH messages received by the mobile station. These two functions are responsible for much of the power consumption during baseband processing.

At a general level, the present invention provides a technique for detecting a message transmitted over a communications channel and determining whether the message contains relevant information (i.e., information which should be fully processed by the receiver). If there is no relevant information in the message, the receiver can avoid wasteful processing of the message. To detect the receipt of relevant information in accordance with the present invention, the mobile station stores at least one test data vector (TDV) corresponding to the relevant value(s) of one or more items of information (e.g., variables) in the form in which the value(s) would appear within a received message at the selected detection point (e.g., after demodulation and equalization but before deinterleaving and decoding). Each TDV, therefore, provides one or more "test windows" each containing the expected bits of a relevant value of an item of information at the detection point (because of channel coding, for example, the number of bits in any test window may be larger than the number of bits in the relevant value of the information item).

According to the present invention, when a message is received, the mobile station forms a received data vector (RDV) from the message at the detection point and then compares the RDV to each stored TDV (which contains at least one test window corresponding to a particular relevant value). If the difference between the bits within a test window of any TDV and the corresponding bits in the RDV is below a threshold (taking into account possible channel errors), the mobile station determines that a relevant value of an item of information (corresponding to that test window in that TDV) is contained in the received message. The mobile station, therefore, proceeds to decode the received message. On the other hand, if the difference between the test bits of each stored TDV and the respective bits of the RDV is greater than the threshold, the mobile station determines that no relevant values of any items of information of interest are contained in the received message. The mobile station, therefore, returns to sleep without further processing of the received message.

The complement of the foregoing technique is for the mobile station to detect the receipt of irrelevant information.

For this purpose, the mobile station can store one or more test data vectors corresponding to the irrelevant values of the items of information of interest. Upon receiving a message, the mobile station will form a RDV and compare it to the stored TDVs, as with the original technique. A lower-than-threshold difference between the test bits of any stored TDV and the corresponding bits in the RDV indicates that the received message contains an irrelevant value of a particular item of information (corresponding to that TDV). This complementary technique may be used to detect a particular irrelevant value of a given item of information, and is particularly useful for detecting messages in which there is only one item of information having an irrelevant value. It is also useful for detecting messages containing any item of information which has multiple values most of which are relevant. In this case, the mobile station would require a smaller number of test data vectors if it tested for irrelevant values instead of testing for relevant values (thereby saving memory and reducing the number of TDV-RDV comparisons). Furthermore, the complementary technique may be used as a check on the accuracy of the original technique. For example, where a particular item of information has two values, one of which is relevant and the other irrelevant, if the original technique determines that a received message does not contain the relevant value of this item, the complementary technique can be used to verify that the message contains the irrelevant value.

The TDV-RDV comparison can be performed, and the appropriate decision threshold for purposes of this comparison can be determined, using several different methods which may be readily apparent to those skilled in the art. Some of these methods may have counterparts in the methods for decoding error correction codes as described, for example, in Clarke and Cain, "Error-Correction Coding for Digital Communications" (Plenum Press, 1981). For example, the TDV-RDV comparison may be performed using a bitwise XOR operation which discloses how many test bits in the TDV are different from or are identical to the corresponding bits in the RDV. More specifically, the XORed vector will contain a "1" in each of the bit positions for which the TDV and RDV have different values, and a "0" in each of the bit positions for which the TDV and RDV have identical values. If the "weight" of a vector is defined as the number of "1s" in this vector, then the weight of the XORed vector will denote the bitwise difference between the TDV and RDV. In this case, the threshold can be determined in a manner analogous to determining the number of bit errors a linear block code can correct, this number being expressed as the integer part of D/2, where D represents the minimum "distance" of the error correction code as described in the Clarke and Cain reference.

For example, if an information item has four values (X1–X4) which may be represented by four test data vectors (TDV1–TDV4, respectively), and if it is desired to detect the second and third values (X2 and X3) in accordance with the present invention, then the minimum distance for purposes of detecting the second value (X2) is the smallest difference between TDV2, on the one hand, and TDV1, TDV3 and TDV4, respectively, on the other. This difference can be determined by XORing TDV2 with each of TDV1, TDV3 and TDV4. The minimum weight of the resulting three XORed vectors will be the minimum distance. If this distance is designated as $Q_2$, the nominal threshold for detecting X2 can be set to $Q_2/2$. Similarly, the minimum distance for purposes of detecting X3 can be determined by XORing TDV3 with each of TDV1, TDV2 and TDV4, and taking the minimum weight of the resulting three XORed vectors as the minimum distance. If this distance is designated as $Q_3$, the nominal threshold for detecting X3 can be set to $Q_3/2$. Note that if the receiver is detecting both X2 and X3, it may use two different thresholds, one for detecting X2 (i.e., $Q_2/2$) and another for detecting X3 (i.e., $Q_3/2$). Alternatively, the receiver could use only one threshold which is the smaller of the two thresholds. Note further that if the receiver is detecting only X2 and X3 (and not X1 or X4), it would only need to store TDV2 and TDV3 and the corresponding threshold(s), but would not need to store the other test data vectors (TDV1 or TDV4), although these other TDVs may be used, as described above, for calculating the appropriate threshold(s) outside the receiver (e.g., in a separate computer).

Another method for performing the TDV-RDV comparison does not use a threshold as described above, but may require storing test data vectors for more than the particular values being detected. This method is analogous to the Maximum Likelihood Sequence Estimation (MLSE) decoding method described in the Clarke and Cain reference. Using the previous example of an information item with four possible values, the receiver may store all of TDV1–TDV4 even though it may be looking for only the values X2 and X3. In this case, the RDV is compared (e.g., XORed) to each of TDV1–TDV4. The received value is then declared to be that value corresponding to the TDV which is the "closest" to (has the smallest difference from) the RDV. A variation of this method is to add a further step which tests whether the closest TDV is "close enough" (i.e., whether the difference between this TDV and the RDV is below a certain threshold) so as to increase the reliability of this method. If the closest TDV is not close enough, the received message may be decoded in order to determine with certainty which of the four possible values of the information item is contained in the message.

Applying the foregoing general techniques to the detection of a page message transmitted over a paging channel (PCH) to a mobile station, the relevant information may be defined to include a page to this particular mobile station, and certain values of one or more overhead information elements which the system may add to a page message prior to transmission (this overhead information may be used, for example, for the purpose of controlling certain activities of the mobile station). Empty pages and pages to other mobile stations, on the other hand, may be defined to be irrelevant from the perspective of this particular mobile station. For PCH detection according to the original technique, the mobile station may store a TDV corresponding to a page to this particular mobile station, and a TDV corresponding to each of the relevant values of the overhead information elements of interest. When receiving a page message, the mobile station will form a RDV from the received page message at the detection point, and then use the stored TDVs to determine whether the received page message contains a page for this mobile station and whether it contains relevant overhead information. If no relevant information is contained in the message, the mobile station will perform no further processing of the message.

According to the complementary technique of detecting PCH messages, the mobile station can store a TDV corresponding to an empty page (the mobile station could also store a TDV for a page to every other mobile station in the system, but this may not be feasible if the number of mobile stations is large). A lower-than-threshold difference between the RDV and the stored TDV for an empty page indicates that the received message contains an empty page which should not be processed further by the mobile station (unless, of course, it contains any relevant values of the overhead information elements of interest, as determined from a comparison of the RDV with their respective TDVs). By definition, if the page message does not contain an empty page, it must contain a non-empty page. Thus, a greater-than-threshold difference between the RDV and TDV for an empty page indicates that the received message contains a non-empty page which should be processed further by the mobile station (since it may be a page for it). As this complementary technique requires the mobile station to read all messages containing pages regardless of whether the pages are for it or for another mobile station, it may not be as efficient as testing specifically for a page to this particular mobile station. However, this inefficiency will be minimal during off-peak hours when most page messages contain empty pages.

Figure 8:
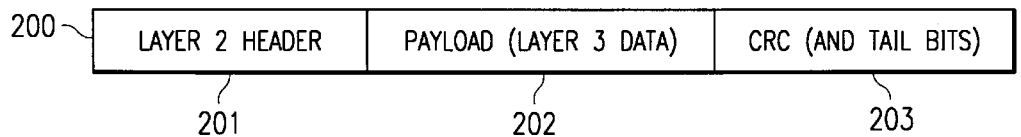
FIG. 8 shows the format for a Layer 2 (L2) frame which may be used to transmit a page message in accordance with several industry or government standards.

The foregoing general aspects of the present invention will now be illustrated in the context of PCH operation according to current industry or government standards (e.g., IS-95 and IS-136 in the U.S., GSM in Europe, and PDC in Japan). Referring next to FIG. 8, most of these standards provide for the construction of a page message (before error correction coding and interleaving) as a "Layer 2" (L2) frame of data 200 containing a Layer 2 header 201, a payload of "Layer 3" (L3) message data 202, and an error detection code such as a cyclic redundancy check (CRC) code with tail bits 203 (tail bits are generally used with convolutional coding and are usually set to zero). The header 201 includes overhead information for radio resource management (e.g., actions to be taken by the receiver) or for other purposes, and may also include an indication of the type or length of the Layer 3 data in the payload 202 (e.g., a bit may be assigned in the header 201 to indicate an empty page message in the payload 202). For an empty page, the payload 202 includes a predetermined value which is defined by the applicable standard (e.g., all zeros in IS-136). For a non-empty page, the payload 202 includes a mobile station identifier (MSID) and, possibly, auxiliary data such as an indication of the type of call (i.e., speech, data, etc.). The header 201 and the payload 202 are encoded with the CRC code 203 for error detection purposes.

Prior to transmission over the PCH, the frame 200 is encoded with an error correction code, and the encoded data is interleaved over one or more slots in accordance with the specification of the applicable standard. At the receiver (e.g., mobile station), the received slot(s) are first demodulated and, possibly, equalized. This is followed by deinterleaving of the demodulated (and possibly equalized) data and channel decoding of the deinterleaved data. The receiver also checks for residual errors by calculating the CRC using the deinterleaved and decoded data (i.e., the received header 201 and payload 202) and comparing the calculated CRC with the received CRC (i.e., the received CRC 203). If the CRC comparison indicates that the data was correctly received, the receiver checks the received header 201 to determine whether any action is required, and whether the message is an empty page. If no action is required and the message is an empty page, the receiver goes back to sleep. If a certain action is required, the mobile station takes the required action. In addition, if the page is not an empty page (i.e., it is a non-empty page), the mobile station compares the received MSID with its own MSID which is stored in memory. If the MSIDs match, the mobile station sends a page response to the system. However, if the MSIDs do not match (i.e., the page is for another mobile station), the mobile station returns to sleep.

The foregoing receive procedure wastes power at the receiver as it requires full processing of page messages even if these messages are empty pages (which, as described before, is most likely) or pages to other mobile stations. It is far more desirable to detect empty pages and/or pages to other mobile stations as early as possible in the receive procedure thereby avoiding unnecessary processing. According to the present invention, an empty page can be detected by storing in the mobile station an empty page message which is formatted, encoded and interleaved as specified in the applicable standard. The mobile station will then perform only demodulation and perhaps equalization of each received PCH slot before comparing it with the stored page message to determine whether it is an empty page or a non-empty page. If the received page is an empty page, the mobile station can immediately return to sleep without engaging in any further, wasteful processing (assuming that the mobile station detects the overhead information associated with this empty page by other means such as, for example, where the overhead information is repeated in several PCH slots and the mobile station fully decodes one of those slots and, therefore, takes any required action which may be specified in the overhead information). On the other hand, if the received page is a non-empty page, the mobile station may continue processing and decoding of the received page as with prior detection techniques.

In the case of a page message formatted as shown in FIG. 8, the empty page detection scheme of the present invention can be implemented by a series of pre-processing steps which may be performed once outside or inside the mobile station followed by a series of processing steps which are performed in the mobile station every time it receives a slot of PCH data. The pre-processing steps may include forming a header 201 and a payload 202 for an empty page message in accordance with the applicable standard (e.g., IS-136). The header 201 may include an empty page indication as mentioned above. The payload 202 for an empty page will usually comprise "filler" information (e.g., all zeros). A CRC is then applied to the header 201 and the payload 202 to form a frame of data as shown in FIG. 8. This data frame is then encoded and interleaved to form what has been referred to herein as a test data vector (TDV). The TDV is now entered into the mobile station for permanent or semi-permanent storage. Thereafter, the mobile station will process each PCH slot by first performing demodulation and perhaps equalization of the received slot to produce what has been designated herein as a received data vector (RDV). At this point, the mobile station will compare the RDV to the TDV (e.g., by an XOR operation) rather than continuing with normal processing (e.g., deinterleaving and decoding). If the difference between these two vectors is smaller than a predetermined threshold (e.g., if the number of "1s" in the XORed vector is less than a certain value), the received slot is determined to contain an empty page, which may then be discarded without further processing. On the other hand, if the difference is equal to or greater than the threshold, the received slot is determined to contain a non-empty page which may be processed further by the mobile station.

Thus, with the empty page detection scheme illustrated above, the mobile station does not have to perform, for example, any deinterleaving or decoding of empty pages as with prior PCH detection techniques. This can result in a substantial reduction of the processing load. Although the TDV-RDV comparison introduces an additional step in the receiver processing which may increase peak-load processing (e.g., when several non-empty pages are received in a row and the mobile station, therefore, is repeatedly decoding the received data), this increase is more than offset by the decrease in processing during off-peak periods (when most of the pages are empty). The net savings can be mathematically expressed as $Z*Y-(1-Z)*X$, where X is the amount of additional processing introduced by the comparison step, Y is the amount of processing saved by not performing deinterleaving and channel decoding, and Z is the percentage of time that the PCH is carrying empty messages. This expression is usually greater than zero since the comparison step is not especially complex (e.g., XOR) and the PCH messages are, most often, empty pages. On average, therefore, the empty page detection technique of the present invention would yield substantial processing (and power) savings.

Even greater processing savings may be achieved if the TDV-RDV comparison of the present invention is performed using less than the all of the data in a page message. For example, where the page message is transmitted over multiple PCH slots it may be possible to distinguish between an empty page and a non-empty page by examining the encoded message bits in one or more, but not all PCH slots. Similarly, where the page message is transmitted in a single PCH slot (i.e., no interslot interleaving) it may be possible to evaluate no more than a small portion (e.g., 10–20%) of the data received in the PCH slot to arrive at a correct decision as to whether it contains an empty page. In other words, it may not be necessary to demodulate and equalize the entire PCH slot (which may be 100–200 bits long), but only a small number of bits (e.g., 30 bits) which are compared to a corresponding number of test bits. The number (and interrelationship) of these bits should be sufficient to create a threshold difference between a non-empty page and an empty page (because of channel errors, a one bit difference between the received bits and the test bits may not be significant and, thus, enough bits must be used to create a comparative difference in multiple bits). Those minimum bits may correspond to a series of consecutive L3 bits (e.g., a string of the first 10 payload bits) in the L2 frame of FIG. 8, but because of (intraslot or interslot) interleaving, those minimum bits may not be delivered in sequence out of the equalizer 113 in FIG. 4. Thus, the use of interleaving may require demodulation and equalization of more than the minimum number of bits in order to reconstruct the bits which are required for a reliable comparison. However, in practice, the TDV-RDV comparison may be performed on the basis of certain (possibly non-consecutive) L3 bits which are selected such that their equivalent bits at the detection point (e.g., after demodulation and equalization) form a series of consecutive minimum bits.

It will be appreciated that using significantly less than all of the bits in a page message as the basis for the TDV-RDV comparison will further reduce processing, but if there is a significant number of channel (bit) errors, it may also introduce decision errors of two types. The first type of errors occurs where the comparison indicates a non-empty page when, in fact, an empty page is received. The second type of errors occurs where the comparison indicates an empty page when, in fact, a non-empty page is received. Errors of the first type imply that the mobile station continues to process an empty page and eventually (after deinterleaving and decoding) arrives at the correct decision that this is an empty page, but without any savings in processing. However, if such errors are rare (e.g., less than 1% error rate), the mobile station can nevertheless capture essentially all of the potential power savings from early detection of empty pages. Errors of the second type, on the other hand, imply that the mobile station may have been paged (it is also possible that the non-empty page is intended for another mobile station), but will not read the page and may miss a call. However, since a typical mobile station only receives a few calls per day, the instances in which it will miss a call because of failure to read a page message may be rare. Nevertheless, errors of the second type, even if rare, are of more concern since they could degrade the level of service received by the user of the mobile station.

When using the technique of testing for an empty page on the basis of less than all the bits of a page message, the goal should be to reduce data processing as much as possible while minimizing all types of decision errors. However, because of the relative importance of the two error types, it may be desirable to control errors of the second type at the expense of errors of the first type. This may be accomplished through computer simulations or calculations, or from experiments with mobile stations in the field, which reveal the preferred or ideal number and position of the bits from the page message which must be used in the TDV-RDV comparison in order to keep errors of the second type below a certain level. Alternatively, the (empty/non-empty page) decision threshold could be biased such that more of the errors made by mobile station are of the first type than of the second type. For example, if an empty page contains all zeros and a typical non-empty page (after channel coding) contains at least Q bits set to one, and if the normal decision criteria is to declare a non-empty page if at least $Q/2$ bits are found to be all ones, the decision criteria could be biased so that less than $Q/2$ (e.g., $Q/2-10$) bits must be ones in order for a received page to be treated as a non-empty page.

In practice, the decision threshold (whether all or less than all of the bits in a page message are used in the TDV-RDV comparison) may have to be continuously adjusted to optimize performance in view of the quality of the current radio channel as reflected in the received signal strength (RSS), signal-to-noise ratio (SNR), frame error rate (FER), bit error rate (BER) or some other channel quality measurement taken or estimate made by the mobile station. Higher RSS or SNR or lower FER or BER imply a higher quality channel which may allow the mobile station to move the threshold from a more conservative position to a less conservative position. Conversely, lower RSS or SNR or higher FER or BER imply a lower quality channel which may require the mobile station to move the decision threshold from a less conservative position to a more conservative position. For example, if the mobile station is testing for an empty page and the initial decision threshold is set to $Q/2$ as described above (i.e., at least $Q/2$ bits in the received page must be ones for it to be declared a non-empty page), the mobile station may use instead a threshold of $(Q/2+15)$ if channel quality improves and, conversely, a threshold of $(Q/2-15)$ if channel quality deteriorates.

The decision threshold may also be adaptively adjusted in the mobile station by reference to prior detection techniques. According to the present invention, the mobile station may be configured to operate in either a full decoding mode in which it fully decodes all PCH slots as with the prior art, or a refined decoding mode in which it decodes the PCH slots in accordance with the teachings of the present invention. These two modes can be invoked by the mobile station at different times and under different circumstances. For example, the mobile station can use the full decoding mode as a reference for adaptively adjusting the decision threshold in the refined decoding mode. This may be implemented by placing the mobile station in an initial training phase in which it invokes both decoding modes (starting perhaps with a relatively conservative decision threshold for the refined decoding mode). During this training phase the mobile station compares the decisions made by the refined decoding mode with the actual outcome as determined from the full decoding mode, and then adjusts the decision threshold in the refined decoding mode so as to minimize errors (e.g., errors of the second type as discussed previously). After this initialization phase, the mobile station will invoke only the refined decoding mode except at predetermined intervals (or in response to particular events) when it once again readjusts its decision threshold.

The empty page detection technique of the present invention, as described above, may be expected to allow the mobile station to avoid fully processing the majority (up to, for example, 85–95%) of page messages received over a 1-day period. To reach a performance goal near the limit of 100% of pages which do not have to be fully processed, the mobile station should attempt to avoid full processing of all page messages except those containing its MSID. For this purpose, the present invention provides for the use of a test data vector (TDV) which represents a non-empty page to this particular mobile station (i.e., a page message containing its MSID). As with the TDV for an empty page message, the TDV for this particular non-empty page message is formatted, encoded and interleaved as specified in the applicable standard, and then stored in the mobile station for comparison with the received data vector (RDV). If several different L2 frame types are used for paging according to the applicable standard, the mobile station may store several TDVs (corresponding to these frame types) for comparison with the RDV. The comparison between the TDV(s) and the RDV allows the mobile station to determine whether or not the received page message is a non-empty page for this mobile station (as distinguished from empty pages or pages for other mobile stations). If the received page message is determined to contain a page for this particular mobile station (hereinafter sometimes referred to as a "mobile-specific" page), the mobile station may immediately respond to the page without any further processing or decoding of the received page message or, alternatively, it may continue processing and decoding of the received page message so as to verify the page before transmitting its page response. On the other hand, if the received page message does not contain a mobile-specific page, the mobile station can immediately return to sleep and avoid any further, wasteful processing of the received page message.

In general, a mobile station may use one or both of the empty page and mobile-specific page detection techniques of the present invention as described above. The empty page detection technique allows the mobile station to filter out empty pages and thus to avoid decoding most page messages. For even greater efficiency, the mobile-specific page detection technique may be used so that the mobile station will only decode (for verification purposes) page messages directed to it. These two techniques may be selectively applied in practice. For example, a mobile station may monitor the level of paging activity over a predetermined period (e.g., a 24-hour day) to identify busy hours (high level of paging activity) and non-busy hours (low level of paging activity). Assuming that subsequent periods substantially follow the pattern of paging activity recorded over the predetermined period, the mobile station may use the mobile-specific page detection technique during the busy hours in those periods. During the non-busy hours, the mobile station could use instead the empty page detection technique without a substantial loss in sleep mode efficiency as compared with the mobile-specific page detection technique. This may be advantageous where, because of the specification of many different types of paging frames, multiple test data vectors must be used for detecting a specific page to this mobile station, whereas only one test data vector is needed for detecting an empty page (which saves memory and reduces the number of TDV-RDV comparisons in the mobile station).

The foregoing techniques for detecting an empty page or a mobile-specific page apply regardless of how the received page (message data) is processed after demodulation in the receiver. The particular processing steps may change the point at which the RDV is formed (e.g., in FIG. 4, this point may move from the output to the input of the symbol detector 126 or the equalizer 113), but the basic principle of the present invention will not change. For example, U.S. Pat. No. 5,230,003 to Paul Dent and the present inventor, which is hereby incorporated herein by reference, discloses a method for decoding received information using a "soft decision." If this method is used in the receiver, the RDV will not be comprised of logical ones and zeros as described before, but will generally be comprised of real numbers (each representing the likelihood of a corresponding bit being received correctly) associated with a (+/−) sign (representing a one or a zero bit, respectively). In this case, a generalization of the XOR operation may be used in the TDV-RDV comparison. However, the (empty/mobile-specific page) decision criteria will not necessarily be based on a difference in a number of bits, but on a real number difference.

Figure 9:
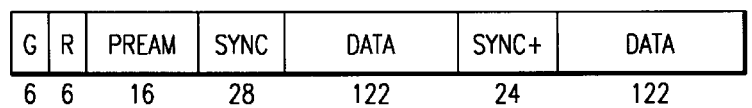
FIG. 9 shows the uplink slot format of the DCCH according to IS-136, another known industry standard.
Figure 10:
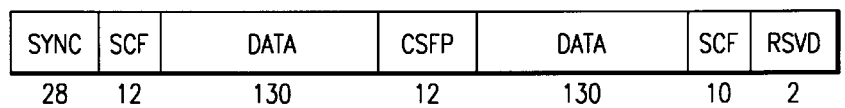
FIG. 10 shows the downlink slot format of the DCCH according to IS-136.

While the foregoing description has illustrated the general operation of the detection techniques of the present invention, the following description will illustrate their operation in the context of one of the current industry standards, namely, the IS-136 standard. IS-136 incorporates a digital control channel (DCCH) which uses the slot length and format of the digital traffic channel (DTCH) defined in IS-54B and discussed previously. However, as shown in FIGS. 9–10, certain of the fields in the DTCH slot have been assigned a new functionality for DCCH operation (compare FIGS. 9 and 10 with FIGS. 5 and 7, respectively). As shown in FIG. 9, for example, the DCCH uplink slot includes a new preamble (PREAM) field which carries no information but is used to allow the base station time to set the receiver amplifier so as to avoid signal distortion. The DCCH uplink slot further includes a new synchronization (SYNC+) field which provides additional synchronization information (fixed bit pattern) for use by the base station. As shown in FIG. 10, the DCCH downlink slot includes a new shared channel feedback (SCF) field which contains information to support the random access scheme on the uplink. The DCCH downlink slot further includes a new coded superframe phase (CSFP) field which contains information to aid the mobile station in finding the start of the superframe on the DCCH. Another notable difference between the DCCH and DTCH slot formats is the absence of interslot interleaving on the DCCH so as to facilitate sleep mode operation.

Figure 11:
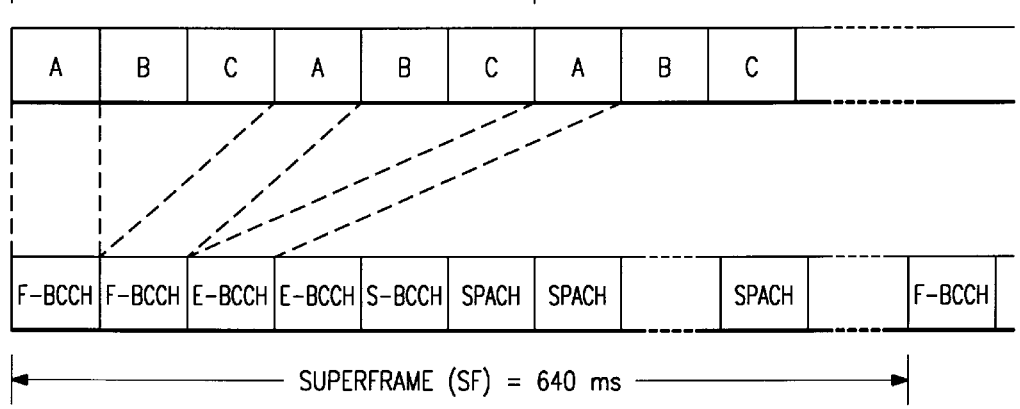
FIG. 11 shows the structure of a superframe defined over the slots of the IS-136 DCCH.

Referring next to FIG. 11 which shows the frame structure of the (downlink) DCCH according to IS-136, the DCCH slots are mapped into logical channels which are organized into a series of superframes (there is no special frame structure for the uplink DCCH as all time slots on the uplink may be used for system access by the mobile station). A full-rate DCCH would occupy two of the six slots of an IS-54B TDMA frame, as shown in FIG. 11 (in this example, channel "A" is assigned to the DCCH). The logical channels specified in IS-136 include a broadcast control channel (BCCH) for carrying system-related information which is broadcast to all mobile stations, and a short message service, paging and access response channel (SPACH) for carrying information which is sent to specific mobile stations. The structure and operation of the BCCH and SPACH are described in more detail below.

For efficient sleep mode operation with fast acquisition at cell (i.e., DCCH) selection, the BCCH is divided into logical subchannels as taught in U.S. Pat. No. 5,404,355. As shown in FIG. 11, the BCCH comprises a fast BCCH (F-BCCH), an extended BCCH (E-BCCH) and a point-to-multipoint short message service BCCH (S-BCCH). The F-BCCH is used to broadcast DCCH structure parameters and other parameters required for accessing the system. The E-BCCH is used to broadcast information that is not as time-critical (for the operation of the mobile stations) as the information in the F-BCCH. The S-BCCH is used for the broadcast short message service (SMS). The SPACH is also divided into logical subchannels (not shown in FIG. 11) including a point-to-point short message service channel (SMSCH), a paging channel (PCH) and an access response channel (ARCH). The SMSCH is used for carrying user messages to a specific mobile station. The PCH is used for carrying paging messages to different mobile stations. The ARCH is used for responding to access requests from one of the mobile station (e.g., by delivering a channel assignment message to this mobile station).

The F-BCCH and E-BCCH allow the system to transmit different kinds of overhead information at different rates depending on its importance to the proper operation of the mobile stations. Information defining the system configuration and the rules for system access by the mobile stations is transmitted in the F-BCCH. Since this information should be transmitted at a rate which allows the mobile station to quickly access the system, a complete set of this information is sent in the F-BCCH once every superframe. Less critical overhead information, however, may be transmitted at a lower rate in the E-BCCH. A complete set of E-BCCH information may span several superframes. The S-BCCH, on the other hand, allows the system to decouple the transmission of overhead information from the broadcast SMS by providing a dedicated channel for SMS messages.

To decouple the requirement of periodicity of reading of the overhead information by the mobile station (for purposes of efficient sleep mode operation) from the requirement of periodicity of BCCH transmission by the system (for purposes of fast acquisition at cell selection), each of the F-BCCH and E-BCCH subchannels is associated with a change flag in another logical subchannel, which indicates when the corresponding BCCH information has changed (e.g., changes in the F-BCCH are indicated by a change flag in the PCH and changes in the E-BCCH are indicated by a change flag in the F-BCCH). The change flags enable a mobile station to avoid re-reading BCCH information which has not changed thereby reducing battery drain, as taught in U.S. Pat. No. 5,404,355. The mobile station will first read the required BCCH information when acquiring the DCCH. Thereafter, however, the mobile station will read only changed BCCH information and can stay in sleep mode when there is no change in the BCCH information. This allows for efficient sleep mode operation (i.e, low periodicity of reading BCCH information) and, at the same time, fast acquisition at cell selection (i.e., higher periodicity of BCCH transmission).

With continuing reference to FIG. 11, a superframe is defined in IS-136 as the collection of 32 consecutive time slots (640 ms) for a full-rate DCCH (16 slots for a half-rate DCCH) starting with the first BCCH slot. The first slot(s) in the superframe are assigned to the F-BCCH and the remaining slots are assigned to the E-BCCH, S-BCCH and SPACH. A mobile station determines from information in the F-BCCH slot(s) at the beginning of the superframe which of the other slots are assigned to E-BCCH, S-BCCH and SPACH, respectively. As shown in FIG. 11, each of the BCCH subchannels (F-BCCH, E-BCCH and S-BCCH) is assigned an integer number of the DCCH time slots in each repeating superframe. The other slots in the superframe, however, are assigned to the SPACH subchannels (SMSCH, PCH and ARCH) on a fully dynamic basis (for this reason, the slots available in each superframe for SMSCH, PCH and ARCH are generically shown as SPACH in FIG. 11). A mobile station identifies the usage of a SPACH slot (i.e, SMSCH, PCH or ARCH) from Layer 2 header information (as described further below in connection with FIG. 15).

IS-136 specifies three forms of mobile station identity (MSID) which may be used for paging a mobile station: the mobile identification number (MIN), the international mobile station identity (IMSI), and the temporary mobile station identity (TMSI). The MIN traces its roots to the EIA/TIA 553 and IS-54 standards (discussed earlier) and is a digital representation of the directory number of the mobile station according to the telephone numbering plan in North America. The IMSI is used for international roaming and it includes a country code which identifies the country of origin of the mobile station, and other information for identifying its home system (for billing and other purposes). The TMSI is assigned to a mobile station on a temporary basis within a specific area (e.g., the service area of an MSC or a location area in this service area) and the mobile station is usually reassigned to another TMSI after a predetermined period of time or when the mobile station moves out of this area. The primary benefit of using the TMSI is increased paging capacity since the TMSI usually contains less bits than the MIN or IMSI and, hence, more pages can be carried in one PCH slot (depending on the assignment procedures for the TMSI, another benefit may be increased user identity confidentiality).

A mobile station according to IS-136 may be assigned a MIN, an IMSI, or both a MIN and an IMSI. The MIN and/or IMSI are referred to as the permanent mobile station identity (PMSID) in IS-136. A mobile station having both a MIN and an IMSI will only use one or the other as its PMSID in any given country, as specified in the IS-136 standard. For example, a mobile subscriber whose home system is in the United States would use only the MIN when operating in the United States since there is no need to send the country code to the system (i.e., there is no need to use IMSI). However, in any given country, the mobile station may use both a PMSID (i.e., either MIN or IMSI) and a TMSI, but at different times. At any given time, the mobile station uses one or the other of PMSID and TMSI. The mobile station will usually monitor its PCH slot for its PMSID. If a TMSI is assigned to the mobile station, the mobile station will then monitor the PCH slot only for the TMSI. The TMSI assignment, however, may expire and if no new TMSI is assigned, the mobile station reverts back to using the PMSID when communicating with the system. In IS-136, an identity type (IDT) field may be included in the Layer 2 frame to inform the mobile station which identity is being used in the page message. The IDT field, however, may not be included in the Layer 2 frame if the type of identity is implicit from the type of frame (e.g., the hard triple page frame shown in FIG. 14 which is used for transmitting up to three 34-bit MINs).

According to IS-136, all pages (whether containing PMSID or TMSI) are repeated in the corresponding time slot in the next superframe so as to increase the likelihood that a mobile station will receive a page even under severe radio conditions. If and only if the mobile station cannot decode the PCH slot in the first ("primary") superframe, it will read the corresponding PCH slot in the second ("secondary") superframe (the primary and secondary superframes are collectively referred as a "hyperframe"). Under normal operating conditions, however, the mobile station will have to read only one slot per hyperframe, which enhances sleep mode efficiency. Each mobile station is assigned to one of eight different paging frame classes (PFCs) which define the frequency with which the mobile station reads its PCH slot (i.e, every nth hyperframe, where n is 1, 2, 3, 6, 12, 24, 48 or 96, providing for "sleep time" from 1.28 to 123 seconds). A mobile station may be reassigned to a different PFC to optimize the trade-off between sleep mode efficiency and call set-up delay (lower PFC implies shorter sleep time and call-set-up delay while a higher PFC implies longer sleep time and call set-up delay). Once the mobile station has read the BCCH (e.g., at power up), it determines which PCH slot to monitor based on its permanent mobile station identity (PMSID), and then enters sleep mode until it receives this slot (or the BCCH information changes). More than one PCH may be defined in a superframe with each PCH occupying one slot. If the system is overloaded (e.g., during busy hours) with pages for one PCH slot, the mobile station may also be required to read another PCH slot as specified in the standard (e.g., another PCH slot in the same superframe).

For purposes of the present invention, it should be noted that although a mobile station complying with IS-136 will "wake up" to read its PCH slot every nth hyperframe as determined by its PFC, the PCH slot in any particular nth hyperframe may be "stolen" for use by another SPACH subchannel since slots are assigned to SPACH subchannels on a dynamic basis and in accordance with capacity requirements. Until deinterleaving and decoding of the Layer 2 header information in the SPACH slot, the mobile station cannot determine whether the SPACH slot is a PCH slot, on the one hand, or an ARCH or SMSCH on the other. This means that when the mobile station is applying the teachings of the present invention to determine (before deinterleaving and decoding) whether its PCH slot contains an empty page message, for example, in certain instances the mobile station may actually be forming the received data vector (RDV) from an ARCH or SMSCH slot instead of a PCH slot. However, since the test data vector (TDV) is here formed from an empty page message containing many filler zeros ("0" bits), and since ARCH and SMSCH messages (being data messages) usually contain many ones ("1" bits), the TDV-RDV comparison in those instances will usually result in the mobile station determining that the difference between the empty page TDV and the RDV from an ARCH or SMSCH slot is greater than the threshold (implying a non-empty page message). The mobile station, therefore, will read the slot only to find that the received message was not a non-empty page message but an ARCH or SMSCH message. However, this result merely reduces battery savings without affecting the level of service for the mobile station. Furthermore, during non-busy hours the ARCH and SMSCH load will usually be low and, thus, will not materially reduce the savings obtained by use of the empty page detection technique. On the other hand, if the mobile station is using the technique of detecting a (mobile-specific) page for it and receives a non PCH message in its PCH slot, it will usually skip reading this message since there is normally a significant (bitwise) difference between its MSID and a typical ARCH or SMSCH message. In sum, the dynamic assignment of PCH slots as provided in IS-136 should not lead to performance degradation in mobile stations using the present invention. Other aspects of the application of the present invention to the IS-136 standard are explored below.

Figure 12:
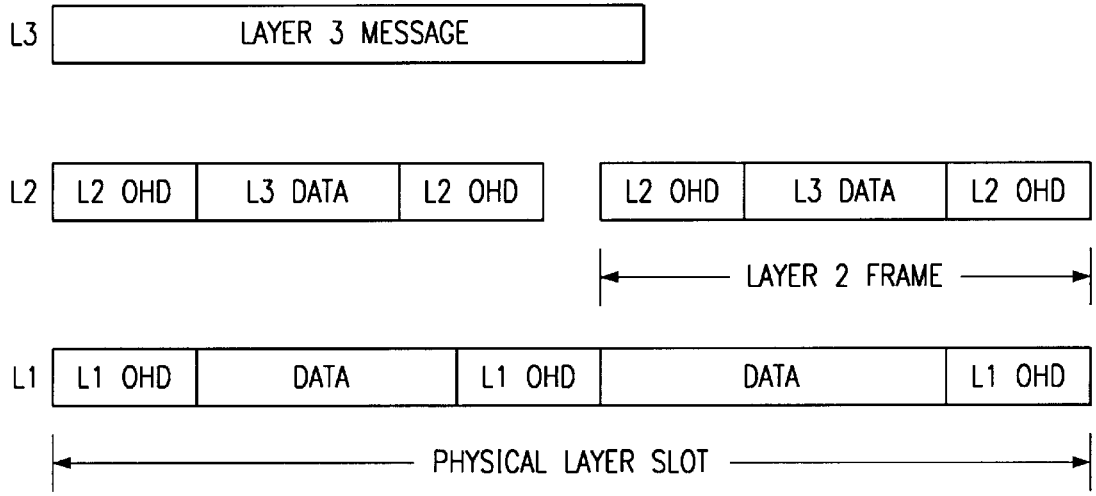
FIG. 12 shows the mapping of Layer 3 (L3) messages into TDM/TDMA slots in accordance with IS-136.

IS-136, like other standards, uses a layered approach to the transmission of messages over the DCCH. FIG. 12 shows how a "Layer 3" (L3) message (e.g., a page message) is translated into one or more "Layer 2" (L2) frames which are then mapped into a "Layer 1" (L1) physical layer slot. The L3 message is parsed into as many L2 frames as needed under the applicable protocol (different protocols are specified for BCCH and SPACH). Each L2 frame comprises L3 data and overhead information for L2 protocol operation. Each L2 frame is mapped into a single L1 slot through the addition of error coding (CRC and tail bits) and overhead information (header) specific to physical layer operation. For all IS-136 DCCH subchannels, L2 operation has been defined to be aligned with L1 operation such that a complete L2 protocol frame is carried within a single underlying physical layer slot. Thus, all bits of any L2 frame are sent within one physical slot (i.e., only intra-slot interleaving is performed after channel coding and before transmission).

Figure 13:
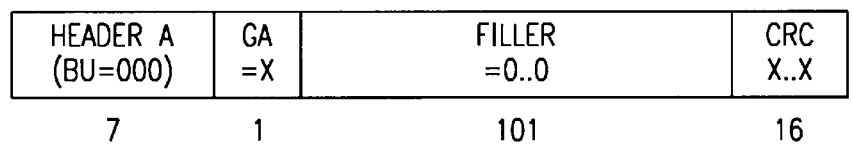
FIG. 13 is an exemplary format for a L2 frame which may be used for transmitting an empty page message in accordance with IS-136.
Figure 14:
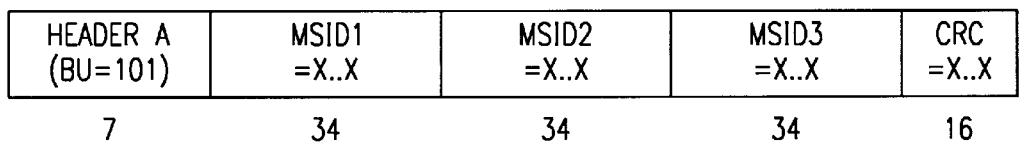
FIG. 14 is an exemplary format for a L2 frame which may be used for transmitting a non-empty page message in accordance with IS-136.
Figure 15:
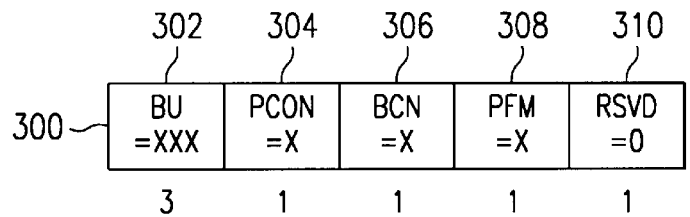
FIG. 15 shows the header which is used in the L2 frames of FIGS. 13–14.

IS-136 specifies different Layer 2 frame formats for different types of Layer 3 messages. Two exemplary L2 frame formats for SPACH messages are shown in FIGS. 13–14. FIG. 13 shows a "null frame" which is sent when no other information needs to be transmitted in any given SPACH burst. This frame would be sent, for example, when transmitting an empty page message on the PCH. FIG. 14 shows a "hard triple page frame" which is used for transmitting a non-empty page message containing up to three 34-bit MINs (IS-136 also specifies a few other paging frames, but FIG. 14 is illustrative for purposes of the present invention). Both of the frames in FIGS. 13–14 begin with a (SPACH) Header A and end with a CRC, but each contains different L3 data. The Header A is shown in more detail in FIG. 15 which is discussed below (IS-136 also specifies a few other headers which are used in other types of SPACH L2 frames, but FIG. 15 is illustrative for purposes of the present invention). Besides the Header A, the null frame of FIG. 13 contains a 1-bit "go away" (GA) field and "filler" data (all zeros). The GA field indicates whether the current DCCH is barred so as to trigger reselection of the DCCH (i.e., the value "0" designates that the DCCH is not barred while the value "1" indicates that the DCCH is barred). The hard triple page frame of FIG. 14, on the other hand, contains the MSIDs (in this case, the MINs) for up to three different mobile stations (MSID1–3).

Referring now to FIG. 15, the Header A 300 includes a 3-bit burst usage (BU) field 302, a 1-bit PCH continuation (PCON) field 304, a 1-bit BCCH change notification (BCN) field 306, a 1-bit paging frame modifier (PFM) field 308 and a 1-bit reserved (RSVD) field 310. The BU field 302 identifies the type of L2 frame (e.g., the value "000" designates a null frame as shown in FIG. 13 while the value "101" designates a hard triple page frame as shown in FIG. 14). The PCON field 304 informs the mobile station whether it should also read another PCH slot in the current superframe (e.g., the value "1" designates continued PCH reading). The BCN field 306 toggles (from one to zero or vice versa) whenever there is a change in F-BCCH or E-BCCH information. The PFM field 308 informs the mobile station whether it should modify its paging frame class (PFC) operation (i.e., the value "0" indicates that the mobile station should use its assigned PFC while the value "1" indicates that it should use the PFC which is one higher or one lower than its assigned PFC, as indicated by information sent in the BCCH). The RSVD field 310 is not currently specified and is therefore set to zero, but may be used, for example, as a change notification which toggles whenever there is a change in the S-BCCH information.

Thus, according to the IS-136 L2 frame formatting, an empty page message (null frame) is not necessarily devoid of any information since its L2 overhead (Header A and GA fields) may actually contain (non-filler) information about certain activities which should be performed by the mobile station. In order to correctly detect (verify) the L2 overhead information, the mobile station needs to check the CRC. However, since the CRC is based on both the overhead and the payload (L3 data), correct detection of the L2 overhead information would require the mobile station to decode the entire L2 frame in order to check the CRC. If this is routinely done, it would vitiate any potential power savings from early detection and disposition of an empty page in the manner discussed before. On the other hand, if the mobile station detects an empty page as described before and, therefore, does not read and verify the L2 overhead information in the null frame, it may miss the opportunity to take certain required actions.

To obtain the benefit of power savings in accordance with the present invention while ensuring proper performance of the mobile station when there are non-filler information elements associated with an empty page message (e.g., the fields in the Header A of FIG. 15), the mobile station can store, in addition to a test data vector (TDV) for an empty page, a set of test data vectors for all relevant values of non-filler information elements whose functions are of interest from a mobile station performance standpoint. The mobile station will then test the data received in the PCH slot not only for an empty page, but also for any relevant overhead information. Each of the additional test data vectors can be computed assuming an empty page (e.g., for an IS-136 null frame, with the BU field set to 000 and the payload consisting of filler zeros) and a relevant value for one of the non-filler information elements, until all desired TDVs are computed. For example, if a particular information element of interest consists of one bit, then one additional test data vector may be calculated with this bit set to "0" or "1" (only a single TDV is needed here even if both the "0" and "1" values are relevant since, by definition, if this bit is determined not to be one value, it is implicitly determined to be the other value). If there are M such information elements, then M additional test data vectors may be computed and stored in the mobile station. When receiving a PCH slot, the mobile station will form a received data vector (RDV) from the data in the PCH slot and then compare the RDV to the stored TDV for an empty page, all in the manner described before. If a non-empty page is detected, the mobile station will decode the message. However, if an empty page is detected, instead of going immediately to sleep, the mobile station will next perform M comparisons between the RDV and the stored TDVs for the 1-bit overhead information elements. If any of these comparisons discloses less than a threshold difference between the RDV and any particular TDV (indicating an empty page with a particular relevant value for an overhead information element), the mobile station may continue to perform full equalization and decoding so as to read and verify this value or, alternatively, it can simply execute the action indicated by this value without first verifying this value by decoding the message. Otherwise, the mobile station will stop all processing of the received slot and return to sleep.

Where, instead of detecting empty pages, the mobile station is detecting its own mobile-specific pages (i.e., page messages containing its MSID), it can still use the set of M test data vectors to capture relevant values of the overhead information elements (since these TDVs provide appropriate test windows for this purpose). The number of TDVs required for detecting a mobile-specific page depends, to some extent, on the types of L2 frames used for paging by the system. If there is only one L2 frame format for page messages and it is used to page only a single mobile station, then only one TDV, which is based on this format, need to be stored in the mobile station in order to detect a mobile-specific page. Depending on the applicable standard, however, there may be several different L2 frame formats which may be used for paging a mobile station (e.g., different frame formats for different types of MSID). Furthermore, at least one of these formats may be used to page several mobile stations at once. The hard triple page frame specified in IS-136 and shown in FIG. 14, for example, may be used to page up to three mobile stations with their respective MINs. In this particular frame format, the MIN of any of these mobile stations can be placed in one of three different positions effectively yielding three different formats which may be represented separately in three different test data vectors. If another MSID (e.g., TMSI) is used simultaneously with MIN (which is not the case in IS-136, but may be the case in other standards), then a similar series of test data vectors may be computed for the frame format used for this other MSID.

In general, if N is the number of possible L2 paging frame formats (taking into account MSID type and position variations), then N test data vectors may be computed to cover all the possible pages to a particular mobile station. Thus, a mobile station which is detecting mobile-specific pages would store a first set of N test data vectors representing L2 frames containing mobile-specific pages, and a second set of M test data vectors representing L2 frames containing relevant non-filler information. Upon receiving and demodulating a PCH slot, the mobile station will form a received data vector (RDV) and then compare the RDV with the first set of N test data vectors to determine whether the received page message contains the MSID for this particular mobile station. If this MSID is found, the mobile station may fully decode the received data so as to verify the receipt of this MSID or, alternatively, it can simply return a page response to the system without first decoding and verifying the data. However, if this MSID is not found, the mobile station next compares the RDV with the second set of M test data vectors to determine whether the received data contains any relevant overhead information. If it does, the mobile station proceeds to fully decode the data (even though the received page message was determined to be either an empty page message or a non-empty page message which does not contain a mobile-specific page) or else to execute any actions indicated by the relevant overhead information without first decoding and verifying the data. However, if the received data does not contain any relevant overhead information, the mobile station can return to sleep.

Note that, in practice, there will be a certain degree of flexibility in formulating the required test data vectors since a given test data vector can test for more than one information element or subject (i.e., it may contain several test windows corresponding to different information elements or subjects). For example, when testing for an empty page associated with M 1-bit information elements, it may be possible to use far less than M+1 test data vectors. In particular, only one test data vector may be sufficient, this vector representing either an empty page with all the information elements set to either zero or one. In this case, the mobile station uses the same test data vector to test for an empty page and also to test for either a zero or a one setting of each of the M information elements. Of course, the various test windows may be spread over several more test data vectors so that, for example, one TDV tests for an empty page while another tests for a zero or one setting of one or more information elements, etc. Similarly, when testing for a mobile-specific page contained within a frame as shown in FIG. 14, it may be possible to use only one TDV with three test windows, one window for each MIN position, instead of using three separate TDVs. Alternatively, two TDVs may be used, the first TDV testing for two MIN positions and the second testing for the remaining position. The foregoing variations are only exemplary and are intended to illustrate the flexibility inherent in the use of test data vectors according to the present invention. This flexibility is maintained so long as the different test subjects or elements (e.g., MSID or overhead information element) within a particular frame format affect different bits at the detection point which can be isolated within a separate test window.

In practice, the use of test data vectors for information elements consisting of only a few bits (e.g., the 1-bit PCON or the 1-bit BCN in FIG. 15) may be limited by the effects of channel errors. This is because the (bitwise) difference between, for example, a page message with the PCON activated (set to 1) and the same page message with the PCON deactivated (set to 0) may be too small to be detected by the mobile station in the presence of channel errors. After channel coding (which transforms the 1-bit value into a few encoded bits), this difference may amount to no more than a few bits. In a clear channel, this difference may suffice for detection purposes. However, in a noisy channel with a significant bit error rate (BER) the mobile station cannot determine with a high degree of confidence whether this difference in a few bits is attributable to a true difference between the RDV and TDV or, instead, is caused by bit errors. As a general rule, the greater the BER across the channel, the greater must the difference be in order for the mobile station to reliably detect the information element (and vice versa). Thus, in a noisy channel the reliability of using a test data vector for detecting a 1-bit information element may not be too high, which may require the mobile station to decode received messages more often than necessary so as not to miss a relevant setting of the information element. As described below, however, for IS-136 these concerns may be addressed by solutions which are based on the nature of each information element.

For some L2 overhead information specified in IS-136, the mobile station has multiple opportunities to read this information. For example, if the BCN bit has been toggled (zero to one or one to zero) in the current superframe to indicate that the BCCH information has changed, but the mobile station does not read the L2 header, it will miss the opportunity to update the BCCH information during the next superframe. However, since the system will generally maintain the BCN at its new value for several more superframes, it may be sufficient for the mobile station to periodically (e.g., every 5th superframe) decode the entire PCH slot (even if it is carrying an empty page) in order to read the L2 header. At all other times, the mobile station can process page messages in accordance with the present invention with its attendant power savings. A potential drawback to this solution is where the system, for example, toggles the BCN bit in two consecutive superframes and the mobile station read s the second (or another subsequent) superframe. In this instance, the mobile station will not update the BCCH information since the change notification would have returned to its original value after two consecutive toggles. However, it is believed that such instances will be rare in practice for two reasons. First, to ensure that a mobile station is alerted as to changes in BCCH information, existing systems usually do not toggle the BCN in two consecutive superframes because of the possibility that a mobile station may miss reading the PCH slot in the first superframe due to channel errors. Second, proper management of the BCCH requires that the frequency of changes in the BCCH information be no greater than the lowest frequency of reading the PCH slot according to the highest PFC of the mobile stations operating in the system (so that even the mobile stations assigned to the highest PFC will be able to keep up with changes in the BCCH information). In sum, for purposes of detecting the BCN over a noisy channel, the solution of fully decoding the PCH slot at regular intervals should be quite effective in practice.

For certain other L2 header information (e.g., PCON), its value is valid for only the current L2 frame. For the mobile station to act properly, it must not miss a single setting (or resetting) of this instantaneous information (note that for PCON, only its setting may be considered relevant since its resetting means that the mobile station does not need to take the associated action of reading the next PCH slot). However, so me of this instantaneous information may be activated under circumstances which would generally lead the mobile station to automatically read this information by application of the detection techniques of the present invention. In these circumstances, there is no need to explicitly detect the information element (by using a corresponding test data vector). For example, according to IS-136, the PCON bit is activated whenever one or more pages which must be sent by the system cannot be accommodated in the current PCH slot because it contains either the maximum number of MSIDs (e.g., 5 MSIDs must be sent and the system is using the L2 frame shown in FIG. 14) or a "soft" page (i.e., a page to a single mobile station with the rest of the slot being used to carry a user message to that mobile station). In either instance, the L2 frame in the current PCH slot, by definition, will contain at least one MSID and possibly some user data, which means that on average the L2 frame will contain many "1s" (1-bits). Thus, the received data vector (RDV) corresponding to this L2 frame will be sufficiently different (bitwise) from a zero-filled empty-page test data vector (TDV) to cause the mobile station to decode the entire L2 frame and automatically read the overhead information, including PCON. Assuming that the other L2 overhead information elements (e.g., BCN) are otherwise detected (e.g., by a full reading of the PCH slot on a regular basis as described above), the mobile station would need to store only one test data vector for an empty page in accordance with the present invention.

If, for greater sleep mode efficiency, a mobile station is constructed in accordance with the present invention to specifically detect a non-empty page for itself (containing its MSID) instead of merely detecting an empty page, it may still be possible to efficiently detect PCON without using a corresponding test data vector which explicitly tests for PCON. According to IS-136, a paging frame can contain up to three MINs (or up to 5 TMSIs). If the paging load on the PCH is low, most paging (L2) frames will contain only a single MSID (MIN or TMSI). Thus, the mobile station can store one test data vector representative of a paging frame containing only its MSID (either MIN or TMSI since only one or the other is used at any one time). This MSID is inserted into the portion of the frame corresponding to the first MSID position (i.e., the position closest to the header in an IS-136 paging frame). The residual portion (corresponding to the other MSID positions) is filled with zeros. When a page message is received by the mobile station, it forms a received data vector and compares it with the stored TDV across these two different portions (i.e., this TDV has two test windows). The mobile station first compares the residual portion of the TDV to the corresponding portion of the RDV to determine whether the received page message includes more than a single page (i.e., whether it is a multiple page which also includes at least one other page or whether it is a soft page which also includes a user message). If the (bitwise) difference between these respective portions is greater than the threshold, the received message is determined to be a multiple page or a soft page. Hence, the mobile station proceeds to decode the message since the other page or the user message in the residual portion may be for it. Because PCON will usually be activated only if the residual portion is filled with data (MSID or user message), the mobile station will automatically read an activated PCON as a result of the first comparison. On the other hand, if the first comparison indicates that the page message is not a multiple page or a soft page, the mobile station will next compare the portion of the TDV containing its MSID with the corresponding portion of the RDV to determine whether the received message is a single page to this mobile station. If there is a match (i.e, lower-than-threshold difference) between these other respective portions, the received message is determined to be a single page to this mobile station which may then be decoded by the mobile station (or the mobile station may merely respond to the page without first decoding the message). If there is no match, the received message is either a single page to another mobile station or an empty page. Hence, the mobile station can go to sleep without decoding the message.

The foregoing solution of implicitly detecting PCON is premised on the mobile station reading all L2 frames where the PCON may be activated. This ensures that the mobile station will not miss any pages for it which may be sent outside its assigned PCH slot, but requires that the mobile station read all multiple page (or soft page) frames sent in its assigned slot even if it turns out that none of the pages in these frames is for this mobile station. During off-peak hours (e.g., nighttime or weekends), there will be only a few multiple page frames which the mobile station is required to read and, thus, this solution can be used during those hours without jeopardizing the gains in sleep mode efficiency obtained with the present invention. During busy hours, however, many more multiple page frames may be transmitted by the system, only a few of which, if any, containing a page for this mobile station. During those busy hours, the mobile station may need to use a set of N test data vectors corresponding to all the possible frame positions for its MSID (constructed as explained earlier, i.e., a first TDV corresponding to being paged first in the frame, a second TDV corresponding to being paged second in the frame, etc.). This will enable the mobile station to limit its reading of multiple page frames to those containing its MSID. To detect PCON in that situation, the mobile station may have to resort to explicitly testing for PCON by using a test data vector corresponding to PCON set or not set. Alternatively, the mobile station could use a TDV corresponding to a multiple page frame containing the maximum number of pages, but with each of the MSID positions being filled with zeros. In this way, the mobile station can test whether the received message is "full" by testing whether each MSID position is empty or non-empty. If all MSID positions are non-empty, the mobile station reads the received message so as to capture any possible setting of the PCON. While this may lead to some unnecessary processing of page messages (i.e., full page messages containing pages to other mobile stations, but not a page to this mobile station, and PCON not set), those instances may be relatively rare in practice so as not to represent a significant constraint on sleep mode efficiency.

For the IS-136 application of the present invention, as described above, another factor should be taken into account for optimal PCH detection. According to IS-136, the digital control channel (DCCH) slots employ a digital verification color code (DVCC) similar to that used for the digital traffic channel (DTCH) slots of IS-54B. As shown in FIGS. 5 and 7, the DVCC is explicitly transmitted in a designated field of each DTCH slot. Furthermore, according to IS-54B, the DVCC is fed along with the data to the channel coding algorithm which performs the CRC calculation. Thus, The DVCC, is also implicitly contained in the data field of each DTCH slot. By contrast, in IS-136 the DVCC is not transmitted as explicit information (see FIGS. 9–10), but only as implicit information which is incorporated into the CRC calculation for the L3 data. This is true for all DCCH slots except F-BCCH slots where the DVCC is explicitly transmitted as part of the L3 data. By reading the F-BCCH slots first (e.g., at cell selection), the mobile station can obtain the DVCC value and thus be able to decode the encoded data in the other DCCH slots. For these other slots (including the PCH slot), although the calculated CRC is only 16 bits long, the number of payload bits which are affected by the use of the DVCC in the CRC calculation is actually more than 16 bits because of the use of rate ½ convolutional encoding in the channel coding algorithm. Referring to FIG. 10, the total number of bits in the DATA field(s) of each (downlink) DCCH slot is 260. This means that the values of more than 6% of the DATA bits are influenced by the DVCC. This does not present a problem if these bits are not needed for the TDV-RDV comparison (i.e., if none of these bits is included in any test window of the TDV being used by the mobile station). However, if one or more of these bits is required for a more reliable TDV-RDV comparison, the DVCC should be incorporated into the calculation of the test data vector(s).

It will be appreciated that because there are many possible values of the DVCC, and the mobile station may acquire a different DVCC value at each cell reselection, the relevant DVCC value at any given moment is not known in advance and, therefore, the test data vectors cannot be precalculated based solely on this value. Instead, it may be necessary to precalculate and store in the mobile station multiple sets of test data vectors corresponding to all the possible values of the DVCC (e.g., 256 DVCC values are specified in IS-136). Whenever a new DVCC is acquired, the mobile station will use the stored set(s) of test data vectors corresponding to that DVCC. Alternatively, the mobile station can calculate the appropriate set(s) of test data vectors on a dynamic basis after each acquisition of a new DVCC. During the time it takes the mobile station to complete this calculation, it can full decode any received PCH slots so as not to miss any relevant information. This alternative solution should not materially impact the overall processing savings which would be achieved over a day's time, for example, since the calculation would only be performed occasionally (e.g., at cell reselection) and, in general, it should require no more than a few seconds to complete. Thereafter, the mobile station can detect the PCH using the power-saving techniques of the present invention.

Figure 16A:
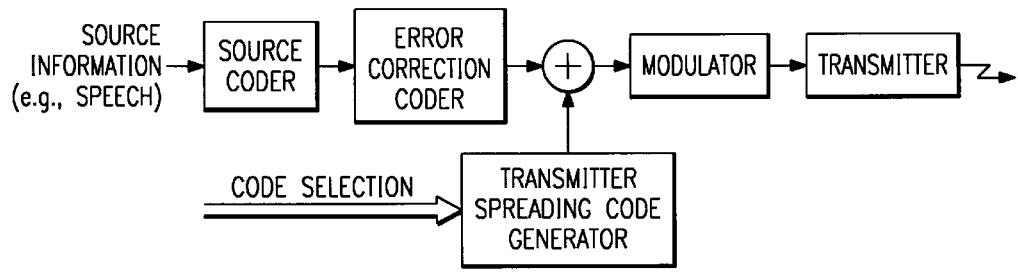
FIG. 16 is a block diagram of a code division multiple access (CDMA) transmitter (FIG. 16A) and receiver (FIG. 16B) which may be used in accordance with the present invention.
Figure 16B:
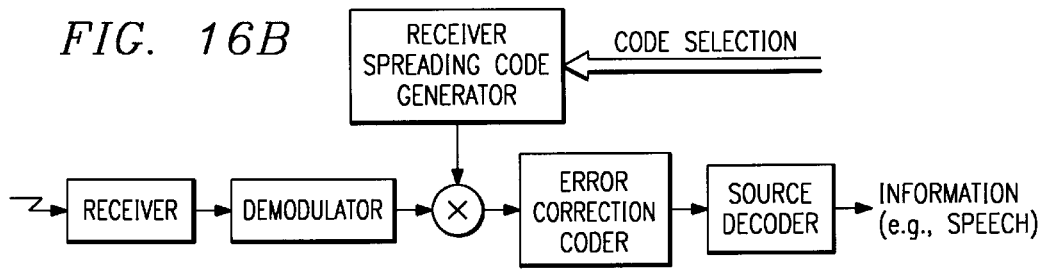

While the foregoing description has illustrated the present invention in the context of the IS-136 standard which uses TDMA, it will be appreciated that the present invention has applicability within the context of other standards which use different access methods. The IS-95 standard, for example, uses direct sequence or direct coding spread spectrum which is a digital version of noise modulation. In noise modulation, the original signal is added to (mixed with) a stronger noiselike signal with known characteristics. The resulting signal modulates a carrier for transmission to a receiver. At the receiver, a copy of the noiselike input to the transmitter is subtracted from the received signal to recover the original signal. In direct sequence, a fast rate pseudorandom binary sequence is used for the noiselike signal. This pseudonoise (PN) sequence is added to the digital information signal (e.g., digital speech) and the resulting bit stream is transmitted, as generally shown in FIG. 16A. At the receiver, the PN sequence is subtracted to yield the information signal, as generally shown in FIG. 16B. Because the transmitted signal has a high bit rate (e.g., 100 Mbps), a "spread spectrum" (i.e., wide band) is required (e.g., 100 MHz). Many users can share the entire channel simultaneously with each user being assigned a code for generating the quasi-random sequence which is mixed with the information signal. The signals are separated in each receiver by using a correlator or a matched filter which accepts only signal energy from the assigned binary sequence for despreading.

Figure 17:
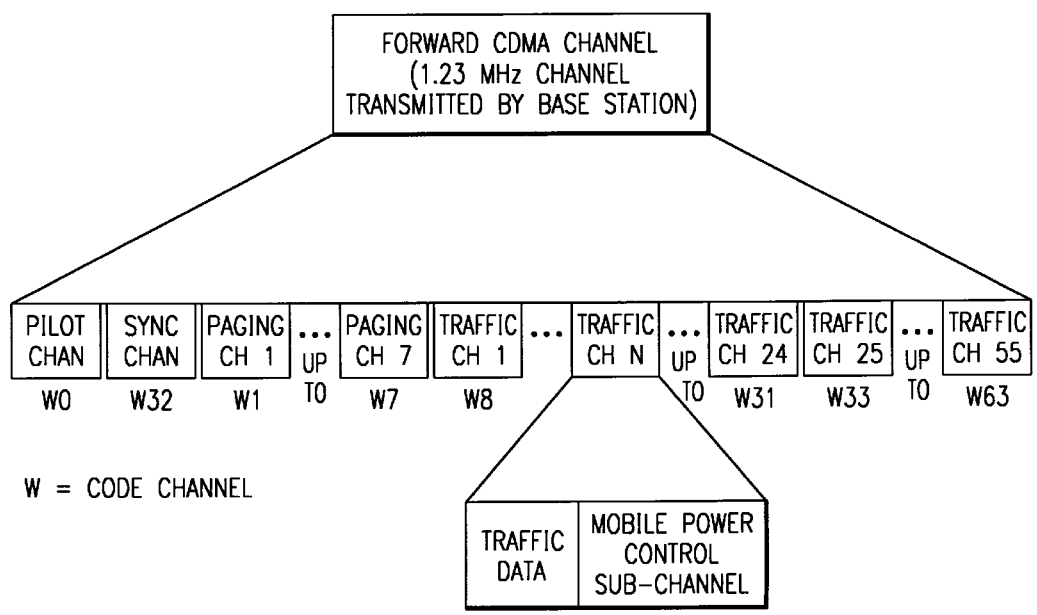
FIG. 17 shows the structure of a CDMA RF channel according to IS-95, another known industry standard.

FIG. 17 shows the overall structure of the forward (base station to mobile station) CDMA channel specified in IS-95. The forward CDMA channel occupies a 1.23 MHz segment of spectrum centered on one of the 30 KHz channels of the existing analog cellular system. According to IS-95, the forward CDMA channel consists of up to 64 code channels (W0–W63) assigned to different uses, for example, a pilot channel (W0), a synchronization channel (W32), seven paging channels (W1–W7), and fifty five traffic channels (W8–W31 and W33–W63). Each of these code channels is spread by an orthogonal PN sequence at a fixed chip rate of 1.23 Mcps (a "PN chip" is one bit in the PN sequence). Multiple forward CDMA channels may be transmitted by a base station in a frequency division multiplexed manner. The pilot channel carries an unmodulated direct sequence spread spectrum signal which is continuously transmitted on each active forward CDMA channel of a base station. A mobile station operating within the coverage area of the base station uses this signal for synchronization (acquisition, timing and phase reference for coherent demodulation) and for signal strength comparisons between base stations to determine when to handoff. Each base station uses a time offset of the pilot PN sequence to identify the forward CDMA channels. Different base stations are, therefore, identified by different pilot PN sequence offsets. The sync channel is used by the mobile station to obtain system configuration and timing information (e.g., system identification, system time, pilot PN sequence offset, paging channel data rate, etc.). Each traffic channel (user) is identified by a distinct long code sequence (1.23 Mcps) which is added to the information bits prior to spreading by the PN sequence. Each paging channel is divided into a number of 80 ms time slots. A mobile station can operate in either "slotted" or "nonslotted" mode for purposes of receiving paging and control messages on the paging channel. In the slotted mode, the mobile station monitors the paging channel only during certain assigned slots. In the non-slotted mode, the mobile station monitors all slots of the paging channel.

The teachings of the present invention can be used by a CDMA-capable mobile station which is monitoring the paging channel specified in IS-95 to achieve processing efficiencies which are similar to those obtained by a TDMA-capable mobile station which is monitoring the PCH specified in IS-136. While there may be differences in some of the radio and baseband processing hardware used in the CDMA-capable and TDMA-capable mobile stations (e.g., the CDMA-capable mobile station may use a RAKE receiver, but not an equalizer as used in the TDMA-capable mobile station), these differences affect only the location in the decoding chain at which the test and received data vectors are compared. In both cases, however, the common underlying principle is to move the (relevant/non-relevant information or empty/non-empty page) decision to a reference point in the overall decoding process at which substantial power savings can be gained (e.g., after the demodulator but before the source decoder in FIG. 16B). This is also true for different mobile station configurations complying with the same standard. For example, a mobile station complying with IS-136 or the Pacific Digital Cellular (PDC) standard could use a differential detector instead of an equalizer when decoding a page message. In this case, the decision point may be at the output of the differential detector but before the channel decoder, thus allowing for substantial power savings.

It will be appreciated by persons of ordinary skills in the art that where interslot interleaving of paging messages is used, application of the present invention may result in substantial savings in RF processing in addition to savings in baseband processing. The GSM standard, for example, which uses TDMA, specifies the interleaving of PCH messages (L2 paging frames) over four slots. If an appropriate test data vector (TDV) according to the present invention can be formed from the bits in less than all four slots (e.g., the first three slots), the mobile station may be able to construct the corresponding received data vector (RDV) from less than all four slots and, therefore, it may be able to skip reading of at least one entire slot. During that slot, the mobile station can turn off not only its baseband processing circuitry, but also its RF processing circuitry thereby effectively placing the mobile station in sleep mode for the duration of that slot.

Regardless of the standard in force, the present invention will apply to detecting messages whenever there is a detectable difference between a test data vector for a test message (e.g., an empty page message) and the received data vector for the received message (e.g., a non-empty message). The difference must be such that it can be reliably detected (e.g., by proper adjustment of the decision threshold in the presence of channel errors). In IS-136, for example, the L2 frame for an empty page is characterized by two attributes: the BU field in the L2 header is set to a particular value (BU=000) and the payload (L3 data) of the frame is filled with all zeros. Other standards, however, may define an empty page as an L2 frame containing a predetermined or invalid (but not necessarily all zeros) MSID in the payload with no associated identification in the L2 header. However, as described further below, so long as the MSID of a particular mobile station is sufficiently different from the L3 data for an empty page (whether that is defined to be all zeros or an arbitrary or invalid MSID), that particular mobile station can take advantage of the power-saving, empty-page detection technique of the present invention. For IS-136, which defines the L3 data for an empty page as all zeros, this means that so long as the MSID (MIN, TMSI or IMSI) being used by a particular mobile station contains a considerable number of ones in binary format (e.g., a certain number of 1-bits when the digits of MIN have been converted to binary information), that particular mobile station can detect the difference between an empty page and a non-empty page for it (i.e., the bitwise difference between an empty page and a non-empty page will be relatively high).

For MIN, in particular, there are inherent guarantees that its value will contain a sufficient number of ones. As the MIN is a binary representation of a 10-digit telephone number conforming to the North American numbering plan (i.e., 3-digit area code +3-digit prefix +4-digit subscriber number), and as there are no area codes or prefixes which are all zeros (at least in the U.S.), the MIN will have a minimum number of binary "1s" which, on the average, will be close to 50% of the entire number of bits (assuming a zero digit is converted to a string of binary zeros and a non-zero digit is converted to a string containing at least some ones). For TMSI or IMSI, on the other hand, there may not be an inherent guarantee that its value will contain a minimum number of binary 1-bits. Unlike the MIN, TMSI is not based on a telephone number comprising a series of digits, but is defined in binary form so that a TMSI consisting of all zeros or almost all zeros may nevertheless be a valid number. Similarly, the IMSI is not usually the telephone number used to reach the mobile subscriber, but a number which the system obtains by translating that telephone number into another number which is used only as between the system and the mobile station. However, while some mobile stations may be assigned a TMSI or have an IMSI which is all zeros or close to being all zeros and, thus, not sufficiently different from an empty page, as long as a particular mobile station is using a TMSI or IMSI which has a minimum number of ones, that mobile station can successfully distinguish between an empty page and a non-empty page for it. Although this particular mobile station may erroneously determine that a non-empty page to one of the other mobile stations with the close-to-zero TMSI or IMSI is an empty page, it will nevertheless reach the correct result of not reading this page, albeit based on the incorrect conclusion.

Thus, for all MSID types (MIN, TMSI and IMSI), the minimum difference (Q) between an empty page and a non-empty page for purposes of detection by a particular mobile station can be defined as the difference between an empty page and a non-empty page to this particular mobile station at the detection point (for TMSI, this difference must be recalculated after each new assignment of TMSI). Such a definition allows the mobile station to capture specific pages for it while dismissing empty pages and, for the most part, pages to other mobile stations. In IS-136, empty pages contain all zeros and, thus, Q will be the number of 1-bits in the TDV corresponding to the MSID of this particular mobile station. The decision threshold can be initially set, for example, to Q/2 (and subsequently adjusted on the basis of channel errors, as described before). If the current decision threshold is Q/2, the mobile station is detecting empty pages (i.e., the stored TDV corresponds to an empty page) and the TDV-RDV comparison discloses that the bitwise difference is less than Q/2, the received message is declared to be an empty page which need not be decoded by the mobile station. However, if this bitwise difference is more than Q/2, the received page is declared to be a non-empty page which is then decoded by the mobile station.

For the IS-136 application of the present invention, using the foregoing decision criteria with the empty page detection technique would usually lead to an automatic reading of an activated PCON bit by this particular mobile station (since a full paging frame will have many 1-bits, as described previously). One possible exception may be where the system uses all available capacity in a paging frame to page multiple other mobile stations having near-zero MSIDs. Although the system may activate the PCON in this paging frame, the mobile station may erroneously determine that this is an empty paging frame since almost all the bits of the MSIDs in this frame are zeros (while the decision threshold is based on its own MSID which presumably has several non-zero bits). This error, however, will have a negative effect on performance only if the mobile station is paged in the next PCH slot (as defined by the PCON procedure) and, hence, missing the PCON in this paging frame causes the mobile station to miss a page for it in the next paging frame. In practice, such instances should be rare (i.e., there will be only a few, if any, occasions when all the following conditions converge: a multiple page is sent with PCON set, all the MSIDs in this paging frame are near zero, and a page is sent to this particular mobile station in the next PCH slot). These occasions should be even more remote if this particular mobile station is using the empty page detection technique only during non-busy hours (when, by definition, there are only a few paging frames with the maximum number of MSIDs). Furthermore, a page to a particular mobile station is usually repeated by the system in successive PCH slots (independently of the hyperframe structure specified, for example, in IS-136) and, thus, the likelihood is great that the mobile station will detect at least one of those repeated pages.

In sum, where a particular mobile station is detecting empty pages in accordance with the present invention, it can successfully distinguish empty pages from non-empty pages by applying a decision threshold based on the difference (Q) between an empty page and its own MSID. If, instead of detecting empty pages, the mobile station is detecting non-empty pages specifically for it (i.e., the stored TDV corresponds to its MSID which, for TMSI, has to be recalculated after each new assignment), the mobile station may still be able use a decision threshold based on Q (as defined above). In this case, if the TDV-RDV comparison discloses that the bitwise difference is less than Q/2, the received message is declared to be a page for it. Conversely, if this bitwise difference is more than Q/2, the received page is declared to be an empty page or a page to another mobile station. Note, however, that if the difference between an empty page and its own MSID is too small (e.g., because the MSID is close to being all zeros), the mobile station may not be able to reliably detect empty pages and, furthermore, a decision threshold based on this difference may no longer be applicable. Nevertheless, in those instances the mobile station may still be able to detect pages for it using a different threshold or other detection methods (e.g., Maximum Likelihood Detection) as disclosed herein.

In general, those skilled in the art will readily recognize that many modifications and variations may be made to the embodiments of the present invention disclosed herein without substantially departing from the spirit and scope of the present invention. Accordingly, the form of the invention disclosed herein is exemplary and is not intended as a limitation on the scope of the invention as defined in the following claims.

I claim:

1. A method for detecting messages containing various data, said messages being transmitted over a communications channel to a receiver, said method comprising the steps of:

storing in said receiver at least one test data vector (TDV) representing selected data contained in at least one of said messages;

receiving at said receiver data corresponding to one of said messages;

processing said received data to form a received data vector (RDV); and comparing said RDV to said at least one TDV to determine whether said selected data is contained in said received data.

2. The method of claim 1 further comprising the step of discontinuing processing of said received data if said selected data is determined to be contained in said received data.

3. The method of claim 2 wherein said communications channel is a paging channel (PCH), said receiver is in a mobile station, and said selected data comprises an empty page.

4. The method of claim 3 wherein said selected data further comprises a page to other than said mobile station.

5. The method of claim 2 wherein said RDV is formed before decoding of said received data in said receiver and said step of discontinuing processing of said received data comprises not decoding said received data.

6. The method of claim 1 further comprising the step of continuing processing of said received data if said selected data is determined to be contained in said received data.

7. The method of claim 6 wherein said communications channel is a paging channel (PCH), said receiver is in a mobile station, and said selected data comprises a page to said mobile station.

8. The method of claim 7 wherein said selected data further comprises overhead information.

9. The method of claim 6 wherein said RDV is formed before decoding of said received data in said receiver and said step of continuing processing of said received data comprises decoding said received data.

10. The method of claim 1 further comprising the step of taking at least one specified action if said selected data is determined to be contained in said received data.

11. The method of claim 10 wherein said communications channel is a paging channel (PCH), said receiver is in a mobile station, said selected data comprises a page to said mobile station, and said at least one specified action comprises responding to said page.

12. The method of claim 11 wherein said selected data further comprises overhead information and said at least one specified action further comprises an action indicated in said overhead information.

13. The method of claim 1 wherein said selected data is determined to be contained in said received data if the difference between said RDV and said at least one TDV is below a predetermined threshold.

14. The method of claim 13 wherein said RDV is compared to said at least one TDV using a bitwise XOR operation and said threshold is an integral number of bits.

15. The method of claim 13 wherein said threshold is adjusted to minimize errors in detecting said selected data.

16. The method of claim 13 wherein said threshold is adjusted on the basis of channel quality measurements or estimates.

17. The method of claim 16 wherein said threshold is adjusted on the basis of received signal strength (RSS).

18. The method of claim 16 wherein said threshold is adjusted on the basis of signal-to-noise ratio (SNR).

19. The method of claim 16 wherein said threshold is adjusted on the basis of frame error rate (FER).

20. The method of claim 16 wherein said threshold is adjusted on the basis of bit error rate (BER).

21. A mobile station operating in a communications system which transmits to said mobile station a plurality of different page messages including an empty page message containing no page and a non-empty page message containing one or more pages to one or more mobile stations operating in said system, said mobile station comprising:

means for storing a test data vector (TDV) representative of an empty page message;

means for receiving from said system data corresponding to one of said page messages;

means for processing said received page message data into a received data vector (RDV);

means for comparing said RDV with said empty page TDV to determine whether said received page message data corresponds to an empty page message; and means for decoding said received page message data.

22. The mobile station of claim 21 wherein said mobile station discontinues processing of said received page message data if it is determined to correspond to an empty page message.

23. The mobile station of claim 21 wherein said mobile station decodes said received page message data if it is determined not to correspond to an empty page message.

24. The mobile station of claim 21 wherein:

said mobile station also stores at least one test data vector (TDV) representative of a non-empty page message containing a specific page to said mobile station;

during predetermined periods said mobile station compares said RDV to said empty page TDV to determine whether said received page message data corresponds to an empty page message; and during other periods said mobile station compares said RDV to said at least one specific page TDV to determine whether said received page message data corresponds to a non-empty page message containing said specific page.

25. The mobile station of claim 24 wherein during said predetermined periods said mobile station discontinues processing of said received page message data if it is determined to correspond to an empty page message, and decodes said received page message data if it is determined not to correspond to an empty page message.

26. The mobile station of claim 24 wherein during said other periods said mobile station decodes said received page message data if it is determined to correspond to a non-empty page message containing said specific page, and discontinues processing of said received page message data if it is determined not to correspond to a non-empty page message containing said specific page.

27. The mobile station of claim 24 wherein during said other periods said mobile station transmits a page response without decoding said received page message data if it is determined to correspond to a non-empty page message containing said specific page, and discontinues processing of said received page message data if it is determined not to correspond to a non-empty page message containing said specific page.

28. The mobile station of claim 24 wherein said specific page comprises the mobile station identity (MSID) of said mobile station.

29. The mobile station of claim 24 wherein said predetermined periods comprise periods in which most of said page messages transmitted by said system are empty page messages.

30. The mobile station of claim 21 wherein said system transmits each of said page messages in a Layer 2 (L2) frame of data.

31. The mobile station of claim 30 wherein:

said L2 frame includes overhead information having a plurality of different values;

said mobile station also stores at least one test data vector (TDV) representative of one or more selected values of said overhead information; and said mobile station compares said RDV to said at least one overhead information TDV to determine whether said received page message data corresponds to any of said selected values.

32. The mobile station of claim 31 wherein said mobile station decodes said received page message data if it determined not to correspond to an empty page message or to correspond to any of said selected values, and does not decode said received page message data if it determined to correspond to an empty page message and not to correspond to any of said selected values.

33. The mobile station of claim 31 wherein said mobile station unconditionally decodes said received page message data at predetermined intervals so as to read said selected values.

34. The mobile station of claim 31 wherein one of said selected values indicates a particular mobile station control function and said mobile station executes said control function without decoding said received page message data if it is determined to correspond to said one selected value.

35. The mobile station of claim 31 wherein said L2 frame is formatted according to the IS-136 standard.

36. The mobile station of claim 31 wherein said L2 frame is formatted according to the GSM standard.

37. The mobile station of claim 31 wherein said L2 frame is formatted according to the PDC standard.

38. The mobile station of claim 31 wherein said L2 frame is formatted according to the IS-95 standard.

39. The mobile station of claim 21 wherein said processing means comprises means for demodulating said received page message data.

40. The mobile station of claim 39 wherein said processing means further comprises means for equalizing said demodulated page message data.

41. The mobile station of claim 40 wherein said decoding means comprises means for deinterleaving said equalized page message data.

42. The mobile station of claim 41 wherein said decoding means further comprises means for channel decoding said deinterleaved page message data.

43. The mobile station of claim 42 wherein said decoding means further comprises means for detecting said channel decoded page message data.

44. The mobile station of claim 39 wherein said decoding means comprises means for deinterleaving said demodulated page message data.

45. The mobile station of claim 44 wherein said decoding means further comprises means for channel decoding said deinterleaved page message data.

46. The mobile station of claim 45 wherein said decoding means further comprises means for detecting said channel decoded page message data.

47. The mobile station of claim 21 wherein said receiving and processing means comprise a RAKE receiver.

48. The mobile station of claim 47 wherein said decoding means comprises means for despreading said received page message data.

49. The mobile station of claim 48 wherein said decoding means further comprises means for deinterleaving said despread page message data.

50. The mobile station of claim 49 wherein said decoding means further comprises means for channel decoding said deinterleaved page message data.

51. The mobile station of claim 50 wherein said decoding means further comprises means for detecting said channel decoded page message data.

52. The mobile station of claim 21 wherein said TDV represents less than all of the data in an empty page message and said RDV is processed from less than all of said received page message data.

53. The mobile station of claim 21 wherein said received page message data is determined to correspond to an empty page message if the difference between said RDV and said TDV is below a predetermined threshold and is determined not to correspond to an empty page message if said difference is above said threshold.

54. The mobile station of claim 53 wherein said RDV is compared to said TDV using a bitwise XOR operation and said threshold is an integral number of bits.

55. The mobile station of claim 53 wherein said mobile station is configured to operate in a full decoding mode in which said mobile station unconditionally decodes said received page message data and a refined decoding mode in which said mobile station decodes said received page message data only if it is determined not to correspond to an empty page message, said decoding modes being invoked simultaneously during the receipt of a plurality of page messages by said mobile station, and said threshold being adjusted to minimize decision errors made in said refined decoding mode as compared with said full decoding mode while receiving said messages.

56. The mobile station of claim 53 wherein said threshold is adjusted by said mobile station on the basis of channel quality measurements or estimates.

57. The method of claim 56 wherein said threshold is adjusted on the basis of received signal strength (RSS).

58. The method of claim 56 wherein said threshold is adjusted on the basis of signal-to-noise ratio (SNR).

59. The method of claim 56 wherein said threshold is adjusted on the basis of frame error rate (FER).

60. The method of claim 56 wherein said threshold is adjusted on the basis of bit error rate (BER).

61. A mobile station operating in a communications system which transmits to said mobile station a plurality of different page messages including an empty page message containing no page and a non-empty page message containing one or more pages to one or more mobile stations operating in said system, said mobile station comprising:
  means for storing at least one test data vector (TDV) representative of a non-empty page message containing a specific page to this mobile station;
  means for receiving from said system data corresponding to one of said page messages;
  means for processing said received page message data into a received data vector (RDV);
  means for comparing said RDV with said at least one specific page TDV to determine whether said received page message data corresponds to a non-empty page message containing said specific page; and
  means for decoding said received page message data.

62. The mobile station of claim 61 wherein said mobile station decodes said received page message data if it is determined to correspond to a non-empty page message containing said specific page.

63. The mobile station of claim 61 wherein said mobile station transmits a page response without decoding said received page message data if it is determined to correspond to a non-empty page message containing said specific page.

64. The mobile station of claim 61 wherein said mobile station discontinues processing of said received page message data if it is determined not to correspond to a non-empty page message containing said specific page.

65. The mobile station of claim 61 wherein:
  said mobile station also stores a test data vector (TDV) representative of an empty page message;
  during predetermined periods said mobile station compares said RDV to said empty page TDV to determine whether said received page message data corresponds to an empty page message; and during other periods said mobile station compares said RDV to said at least one specific page TDV to determine whether said received page message data corresponds to a non-empty page message containing said specific page.

66. The mobile station of claim 65 wherein during said predetermined periods said mobile station decodes said received page message data if it is determined not to correspond to an empty page message, and does not decode said received page message data if it is determined to correspond to an empty page message.

67. The mobile station of claim 65 wherein during said other periods said mobile station decodes said received page message data if it is determined to correspond to a non-empty page message containing said specific page, and does not decode said received page message data if it is determined not to correspond to a non-empty page message containing said specific page.

68. The mobile station of claim 65 wherein during said other periods said mobile station transmits a page response without decoding said received page message data if it is determined to correspond to a non-empty page message containing said specific page, and does not decode said received page message data if it is determined not to correspond to a non-empty page message containing said specific page.

69. The mobile station of claim 65 wherein said specific page comprises the mobile station identity (MSID) of said mobile station.

70. The mobile station of claim 65 wherein said predetermined periods comprise periods in which most of said page messages transmitted by said system are empty page messages.

71. The mobile station of claim 61 wherein said system transmits each of said page messages in a Layer 2 (L2) frame of data.

72. The mobile station of claim 71 wherein:

said L2 frame includes overhead information having a plurality of different values;

said mobile station also stores at least one test data vector (TDV) representative of one or more selected values of said overhead information; and said mobile station compares said RDV to said at least one overhead information TDV to determine whether said received page message data corresponds to any of said selected values.

73. The mobile station of claim 72 wherein said mobile station decodes said received page message data if it determined to correspond to a non-empty page message containing said specific page or to correspond to any of said selected values, and does not decode said received page message data if it determined not to correspond to a non-empty page message containing said specific page and not to correspond to any of said selected values.

74. The mobile station of claim 72 wherein said mobile station unconditionally decodes said received page message data at predetermined intervals so as to read said selected values.

75. The mobile station of claim 72 wherein one of said selected values indicates a particular mobile station control function and said mobile station executes said control function without decoding said received page message data if it is determined to correspond to said one selected value.

76. The mobile station of claim 72 wherein said L2 frame is formatted according to the IS-136 standard.

77. The mobile station of claim 72 wherein said L2 frame is formatted according to the GSM standard.

78. The mobile station of claim 72 wherein said L2 frame is formatted according to the PDC standard.

79. The mobile station of claim 72 wherein said L2 frame is formatted according to the IS-95 standard.

80. The mobile station of claim 61 wherein said processing means comprises means for demodulating said received page message data.

81. The mobile station of claim 80 wherein said processing means further comprises means for equalizing said demodulated page message data.

82. The mobile station of claim 81 wherein said decoding means comprises means for deinterleaving said equalized page message data.

83. The mobile station of claim 82 wherein said decoding means further comprises means for channel decoding said deinterleaved page message data.

84. The mobile station of claim 83 wherein said decoding means further comprises means for detecting said channel decoded page message data.

85. The mobile station of claim 80 wherein said decoding means comprises means for deinterleaving said demodulated page message data.

86. The mobile station of claim 85 wherein said decoding means further comprises means for channel decoding said deinterleaved page message data.

87. The mobile station of claim 86 wherein said decoding means further comprises means for detecting said channel decoded page message data.

88. The mobile station of claim 61 wherein said receiving and processing means comprise a RAKE receiver.

89. The mobile station of claim 88 wherein said decoding means comprises means for despreading said received page message data.

90. The mobile station of claim 89 wherein said decoding means further comprises means for deinterleaving said despread page message data.

91. The mobile station of claim 90 wherein said decoding means further comprises means for channel decoding said deinterleaved page message data.

92. The mobile station of claim 91 wherein said decoding means further comprises means for detecting said channel decoded page message data.

93. The mobile station of claim 61 wherein said TDV represents less than all of the data in a non-empty page message containing said specific page, and said RDV is processed from less than all of said received page message data.

94. The mobile station of claim 61 wherein said received page message data is determined to correspond to a non-empty page message containing said specific page if the difference between said RDV and said at least one TDV is below a predetermined threshold, and is determined not to correspond to a non-empty page message containing said specific page if said difference is above said threshold.

95. The mobile station of claim 94 wherein said RDV is compared to said at least one TDV using a bitwise XOR operation and said threshold is an integral number of bits.

96. The mobile station of claim 94 wherein said threshold is adjusted by said mobile station on the basis of channel quality measurements or estimates.

97. The mobile station of claim 96 wherein said threshold is adjusted on the basis of received signal strength (RSS).

98. The mobile station of claim 96 wherein said threshold is adjusted on the basis of signal-to-noise ratio (SNR).

99. The mobile station of claim 96 wherein said threshold is adjusted on the basis of frame error rate (FER).

100. The mobile station of claim 96 wherein said threshold is adjusted on the basis of bit error rate (BER).

101. The mobile station of claim 61 wherein said RDV is compared to said at least one TDV using a Maximum Likelihood Detection technique.

102. A method for detecting page messages transmitted to a mobile station, each of said page messages being an empty page message containing no page to any mobile station or a non-empty page message containing one or more pages to one or more mobile stations, said method comprising the steps of:

storing in said mobile station a first set of test data vectors (TDVs) representative of an empty page message;

storing in said mobile station a second set of TDVs representative of a non-empty page message containing a specific page for said mobile station;

receiving data corresponding to a transmitted page message;

processing said received page message data to form a received data vector (RDV);

comparing said RDV with said first or second set of TDVs;

if said RDV is being compared with said first set of TDVs, determining whether said received page message data corresponds to an empty page message; and if said RDV is being compared with said second set of TDVs, determining whether said received page message data corresponds to a non-empty page message containing said specific page.

103. The method of claim 102 further comprising the step of discontinuing processing of said received page message data if it is determined to correspond to an empty page message.

104. The method of claim 102 further comprising the step of decoding said received page message data if it is determined not to correspond to an empty page message.

105. The method of claim 102 further comprising the step of decoding said received page message data if it is determined to correspond to a non-empty page message containing said specific page.

106. The method of claim 102 further comprising the step of transmitting a page response from said mobile station without decoding said received page message data if it is determined to correspond to a non-empty page message containing said specific page.

107. The method of claim 102 further comprising the step of discontinuing processing of said received page message data if it is determined not to correspond to a non-empty page message containing said specific page.

108. The method of claim 102 wherein said first set of TDVs includes one TDV and said second set of TDVs includes a plurality of TDVs.

109. The method of claim 102 wherein said RDV is compared with said first set of TDVs during a first period and compared with said second set of TDVs during a second period.

110. The method of claim 109 wherein said first period comprises off-peak hours in which most transmitted page messages are empty page messages.

111. The method of claim 109 wherein said second period comprises busy hours in which most transmitted page messages are non-empty page messages.

112. The method of claim 109 wherein said mobile station unconditionally decodes said received page message data during a third period.

* * * * *